US012777496B2

(12) United States Patent
Takahashi et al.

(10) Patent No.: US 12,777,496 B2
(45) Date of Patent: Oct. 27, 2026

(54) APPARATUS, BASE STATION, AND COMMUNICATION METHOD FOR APPLYING A SHARING SCHEME TO PRE-CONFIGURED MEASUREMENT GAP

(71) Applicants: DENSO CORPORATION, Kariya-city (JP); TOYOTA JIDOSHA KABUSHIKI KAISHA, Toyota (JP)

(72) Inventors: Hideaki Takahashi, Kariya-city (JP); Tomoyuki Yamamoto, Kariya-city (JP)

(73) Assignees: DENSO CORPORATION, Kariya-city (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 280 days.

(21) Appl. No.: 18/639,392

(22) Filed: Apr. 18, 2024

(65) Prior Publication Data

US 2024/0267929 A1 Aug. 8, 2024

Related U.S. Application Data

(63) Continuation of application No. PCT/JP2022/038775, filed on Oct. 18, 2022.

(30) Foreign Application Priority Data

Oct. 20, 2021 (JP) ................................ 2021-171755

(51) Int. Cl.
*H04W 72/231* (2023.01)
*H04L 5/00* (2006.01)
*H04W 72/542* (2023.01)

(52) U.S. Cl.
CPC ......... *H04W 72/231* (2023.01); *H04L 5/0098* (2013.01); *H04W 72/542* (2023.01)

(58) Field of Classification Search
CPC . H04W 72/231; H04W 72/542; H04W 24/10; H04L 5/0098; H04L 5/001
See application file for complete search history.

(56) References Cited

U.S. PATENT DOCUMENTS 10,631,308 B2 * 4/2020 Cheng .................. H04L 5/0091
2019/0261331 A1 8/2019 Guthmann et al.
(Continued)

FOREIGN PATENT DOCUMENTS

JP 2021507548 A 2/2021
WO WO-2020/086514 A1 4/2020
(Continued)

OTHER PUBLICATIONS

U.S. Appl. No. 18/639,306, filed Apr. 18, 2024, Takahashi et al.
(Continued)

*Primary Examiner* — Afshawn M Towfighi
(74) *Attorney, Agent, or Firm* — Harness, Dickey & Pierce, P.L.C.

(57) ABSTRACT

An apparatus includes: a memory storing a program; and one or more processors configured to execute the program to: receive an RRC message including first configuration information and second configuration information, the first configuration information including information for indicating that a measurement gap is a pre-configured measurement gap (P-MG) and information on sharing of the P-MG, the second configuration information including information for indicating that the P-MG is activated or deactivated; activate or deactivate, based on switching of a downlink BWP, the P-MG according to the information for indicating that the P-MG is activated or deactivated included in the second configuration information in a case where the first configuration information includes the information for indicating that the measurement gap is the P-MG; and apply a sharing
(Continued)

scheme based on the information on the sharing of the P-MG to the activated P-MG in a case where the P-MG is activated.

6 Claims, 23 Drawing Sheets

(56) References Cited

U.S. PATENT DOCUMENTS

| | | | | |
|---|---|---|---|---|
| 2021/0385681 | A1 | 12/2021 | Li et al. | |
| 2022/0217562 | A1* | 7/2022 | Tang | H04W 24/10 |
| 2022/0408291 | A1* | 12/2022 | He | H04W 36/0088 |
| 2023/0328571 | A1* | 10/2023 | Wang | H04W 76/28 370/241 |
| 2024/0147288 | A1* | 5/2024 | Huang | H04B 17/24 |
| 2024/0223323 | A1* | 7/2024 | Huang | H04L 5/0053 |
| 2024/0267776 | A1 | 8/2024 | Takahashi et al. | |
| 2026/0019855 | A1* | 1/2026 | Tao | H04W 24/10 |

FOREIGN PATENT DOCUMENTS

| | | | |
|---|---|---|---|
| WO | WO-2021/066154 | A1 | 4/2021 |
| WO | WO-2023/068271 | A1 | 4/2023 |
| WO | WO-2023/068272 | A1 | 4/2023 |

OTHER PUBLICATIONS

Nokia et al., "Discussion on Pre-configured MG Paterns", Document R4-2114063, 3GPP TSG-RAN WG4 Meeting #100-e, Aug. 16-27, 2021.

Huawei et al., "Discussion on Pre-configured MG", Document R4-2110911, 3GPP TSG-RAN WG4 Meeting #99-e, May 19-27, 2021.

Intel Corporation, "Discussion on Pre-configured Measurement Gap", Document R4-2113150, 3GPP TSG-RAN WG4 Meeting #100-e, Aug. 16-27, 2021.

Huawei et al., "Discussion on Multiple Concurrent MGs", Document R4-2110912, 3GPP TSG-RAN WG4 Meeting #99-e, May 19-27, 2021.

International Search Report dated Dec. 20, 2022 in corresponding application No. PCT/JP2022/038775.

3GPP TSG-RAN WG4 Meeting #100, R4-2114023, Aug. 16-27, 2021, Nokia, Nokia Shanghai Bell, "Discussion on concurrent measurement gaps", pp. 1-11.

3GPP TSG RAN Meeting #92e, RP-211591, Jun. 14-18, 2021, Intel Corporation, MediaTek Inc., "Revised WID on NR and MR-DC measurement gap enhancements", pp. 1-5.

3GPP TSG RAN Meeting #93e, RP-212311, Sep. 13-17, 2021, Intel Corporation, MediaTek Inc., "Status Report to TSG", pp. 1-5.

3GPP TSG RAN WG4 Meeting #100-e, R4-2115438, Aug. 16-27, 2021, RAN4, "LS on R17 NR MG enhancements—Preconfigured MG", pp. 1-2.

3GPP TSG RAN Meeting #100-e, R4-2115340, Aug. 16-27, 2021, Intel Corporation, "WF on R17 NR MG enhancements—Pre-configured MG", pp. 1-4.

3GPP TSG RAN WG4 Meeting #100-e, R4-2115398, Aug. 16-27, 2021, Moderator (Intel Corporation), "Email discussion summary [100-e][224] NR_MG_Part_2", pp. 1-55.

3GPP TSG-RAN WG4 Meeting #99-e, R4-2108034, May 19-27, 2021, Intel Corporation, "WF on R17 NR MG enhancements—Pre-configured MG", pp. 1-10.

3GPP TS 38.331 V16.6.0 (Sep. 2021), "3rd Generation Partnership Project; Technical Specification Group Radio Access Network; NR; Radio Resource Control (RRC) protocol specification (Release 16)", pp. 1-961.

* cited by examiner

FIG.7

21

```
MeasGapConfig ::=        SEQUENCE {
  gapFR2                   SetupRelease { GapConfig }          OPTIONAL,   -- Need M
  ...,
  [[
  gapFR1                   SetupRelease { GapConfig }          OPTIONAL,   -- Need M
  gapUE                    SetupRelease { GapConfig }          OPTIONAL    -- Need M
  ]]

}
```

FIG.8

23

```
GapConfig ::=              SEQUENCE {
  gapOffset                  INTEGER (0..159),
  mgl                        ENUMERATED {ms1dot5, ms3, ms3dot5, ms4, ms5dot5, ms6},
  mgrp                       ENUMERATED {ms20, ms40, ms80, ms160},
  mgta                       ENUMERATED {ms0, ms0dot25, ms0dot5},
  ...,
  [[
  refServCellIndicator     ENUMERATED {pCell, pSCell, mcg-FR2}              OPTIONAL   -- Cond NEDCorNRDC
  ]],
  [[
  refFR2ServCellAsyncCA-r16    ServCellIndex                                OPTIONAL,   -- Cond AsyncCA
  mgl-r16                      ENUMERATED {ms10, ms20}                      OPTIONAL    -- Cond PRS
  ]],
  [[
  preconfiguredGap-r17         SetupRelease {PreconfiguredGapConfig-r17}    OPTIONAL    -- Need M
  ]]
}

PreconfiguredGapConfig-r17 ::=    SEQUENCE {
  preconfiguredGapState-r17         ENUMERATED {activated, deactivated},
  ...
}
```

FIG.11

25

5.5.2.9a Measurement gap preconfiguration

The UE shall:

- 1> if preconfiguredGap is set to setup in GapConfig:
  - 2> if preconfiguredGapState is set to activated:
    - 3> consider the measurement gap configured in accordance with 5.5.2.9 as activated;
  - 2> else if preconfiguredGapState is set to deactivated:
    - 3> consider the measurement gap configured in accordance with 5.5.2.9 as deactivated;
- 1> else if preconfiguredGap is set to release in GapConfig:
  - 2> consider that the activation and deactivation mechanism via preconfiguredGapState, DCI as defined in TS 38.212 or BWP switching by bwp-InactivityTimer as defined in TS 38.321 are not applied to the measurement gap configured in accordance with 5.5.2.9 (i.e. the configured gap is always activated unless it is released).

FIG.12

27

```
GapConfig ::=          SEQUENCE {
  gapOffset              INTEGER (0..159),
  mgl                    ENUMERATED {ms1dot5, ms3, ms3dot5, ms4, ms5dot5, ms6},
  mgrp                   ENUMERATED {ms20, ms40, ms80, ms160},
  mgta                   ENUMERATED {ms0, ms0dot25, ms0dot5},
  ...,
  [[
  refServCellIndicator   ENUMERATED {pCell, pSCell, mcg-FR2}        OPTIONAL   -- Cond NEDCorNRDC
  ]],
  [[
  refFR2ServCellAsyncCA-r16    ServCellIndex                        OPTIONAL,  -- Cond AsyncCA
  mgl-r16                      ENUMERATED {ms10, ms20}              OPTIONAL   -- Cond PRS
  ]],
  [[
  preconfiguredGap-r17         BOOLEAN                              OPTIONAL   -- Need M
  preconfiguredGapState-r17    ENUMERATED {activated, deactivated}
  ]]
}
```

FIG.13

29

5.5.2.9a Measurement gap preconfiguration

The UE shall:

1> if preconfiguredGap is set to TRUE in GapConfig:

2> if preconfiguredGapState is set to activated:

3> consider the measurement gap configured in accordance with 5.5.2.9 as activated;

2> else if preconfiguredGapState is set to deactivated:

3> consider the measurement gap configured in accordance with 5.5.2.9 as deactivated;

1> else if preconfiguredGap is set to FALSE in GapConfig:

2> consider that the activation and deactivation mechanism via preconfiguredGapState, DCI as defined in TS 38.212 or BWP switching by bwp-InactivityTimer as defined in TS 38.321 are not applied to the measurement gap configured in accordance with 5.5.2.9 (i.e. the configured gap is always activated unless it is released).

FIG.16

35

5.5.2.9a Measurement gap preconfiguration

The UE shall:

1> if preconfiguredGap is set to setup in GapConfig:

2> if preconfiguredGapState is set to activated:

3> consider the measurement gap configured in accordance with 5.5.2.9 as activated;

2> else if preconfiguredGapState is set to deactivated:

3> consider the measurement gap configured in accordance with 5.5.2.9 as deactivated;

2> if bwp-InactivityTimer associated with the active DL BWP expires and the active DL BWP is switched to default DL BWP or initial DL BWP as defined in TS 38.321 sub-clause 5.15.1:

3> if the measurement gap is required on the switched active DL BWP, as defined in TS 38.300, sub-clause 9.2.4:

4> activates the measurement gap configured in accordance with 5.5.2.9;

3> else (i.e. the measurement gap is not required on the switched active DL BWP):

4> deactivates the measurement gap configured in accordance with 5.5.2.9;

1> else if preconfiguredGap is set to release in GapConfig:

2> consider that the activation and deactivation mechanism via preconfiguredGapState, DCI as defined in TS 38.212 or BWP switching by bwp-InactivityTimer as defined in TS 38.321 are not applied to the measurement gap configured in accordance with 5.5.2.9 (i.e. the configured gap is always activated unless it is released).

FIG.17

43

```
GapConfig ::=           SEQUENCE {
  gapOffset                INTEGER (0..159),
  mgl                      ENUMERATED {ms1dot5, ms3, ms3dot5, ms4, ms5dot5, ms6},
  mgrp                     ENUMERATED {ms20, ms40, ms80, ms160},
  mgta                     ENUMERATED {ms0, ms0dot25, ms0dot5},
  ...,
  [[
  refServCellIndicator   ENUMERATED {pCell, pSCell, mcg-FR2}          OPTIONAL   -- Cond NEDCorNRDC
  ]],
  [[
  refFR2ServCellAsyncCA-r16   ServCellIndex                           OPTIONAL,   -- Cond AsyncCA
  mgl-r16                     ENUMERATED {ms10, ms20}                 OPTIONAL    -- Cond PRS
  ]],
  [[
  preconfiguredGap-r17        SetupRelease {PreconfiguredGapConfig-r17}   OPTIONAL   -- Need M
  ]]
}

PreconfiguredGapConfig-r17 ::=   SEQUENCE {
  preconfiguredGapState-r17         ENUMERATED {activated, deactivated},
  defaultBWP-PreconfigurdGapState-r17        ENUMERATED {activated, deactivated},
  ...
}
```

FIG.19

45

5.5.2.9a Measurement gap preconfiguration

The UE shall:

1> if preconfiguredGap is set to setup in GapConfig:

2> if preconfiguredGapState is set to activated:

3> consider the measurement gap configured in accordance with 5.5.2.9 as activated;

2> else if preconfiguredGapState is set to deactivated:

3> consider the measurement gap configured in accordance with 5.5.2.9 as deactivated;

2> if bwp-InactivityTimer associated with the active DL BWP expires and the active DL BWP is switched to default DL BWP or initial DL BWP as defined in TS 38.321 sub-clause 5.15.1:

3> if defaultBWP-PreconfigurdGapState is set to activated:

4> activates the measurement gap configured in accordance with 5.5.2.9;

3> else if defaultBWP-PreconfigurdGapState is set to deactivated:

4> deactivates the measurement gap configured in accordance with 5.5.2.9;

1> else if preconfiguredGap is set to release in GapConfig:

2> consider that the activation and deactivation mechanism via preconfiguredGapState, DCI as defined in TS 38.212 or BWP switching by bwp-InactivityTimer as defined in TS 38.321 are not applied to the measurement gap configured in accordance with 5.5.2.9 (i.e. the configured gap is always activated unless it is released).

FIG.22

51

5.5.2.9a Measurement gap preconfiguration
The UE shall:
1> if preconfiguredGap is set to setup in GapConfig:
2> if preconfiguredGapState is set to activated:
3> consider the measurement gap configured in accordance with 5.5.2.9 as activated;
3> if measGapSharingConfig is configured for this measurement gap configuration:
4> consider the measurement gap sharing configured in accordance with 5.5.2.11 as activated;
2> else if preconfiguredGapState is set to deactivated:
3> consider the measurement gap configured in accordance with 5.5.2.9 as deactivated;
3> if measGapSharingConfig is configured for this measurement gap configuration:
4> consider the measurement gap sharing configured in accordance with 5.5.2.11 as deactivated;
2> if bwp-InactivityTimer associated with the active DL BWP expires and the active DL BWP is switched to default DL BWP or initial DL BWP as defined in TS 38.321 sub-clause 5.15.1:
3> if the measurement gap is required on the switched active DL BWP, as defined in TS 38.300, sub-clause 9.2.4:
4> activates the measurement gap configured in accordance with 5.5.2.9;
4> if measGapSharingConfig is configured for this measurement gap configuration:
5> activates the measurement gap sharing configured in accordance with 5.5.2.11;
3> else if defaultBWP-PreconfigurdGapState is set to deactivated:
4> deactivates the measurement gap configured in accordance with 5.5.2.9;
4> if measGapSharingConfig is configured for this measurement gap configuration:
5> deactivates the measurement gap sharing configured in accordance with 5.5.2.11;
1> else if preconfiguredGap is set to release in GapConfig:
2> consider that the activation and deactivation mechanism via preconfiguredGapState, DCI as defined in TS 38.212 or BWP switching by bwp-InactivityTimer as defined in TS 38.321 are not applied to the measurement gap configured in accordance with 5.5.2.9 (i.e. the configured gap is always activated unless it is released).

FIG.23

53

5.5.2.9a Measurement gap preconfiguration

The UE shall:

1> if preconfiguredGap is set to setup in GapConfig:
    2> if preconfiguredGapState is set to activated:
        3> consider the measurement gap configured in accordance with 5.5.2.9 as activated;
        3> if measGapSharingConfig is configured for this measurement gap configuration:
            4> consider the measurement gap sharing configured in accordance with 5.5.2.11 as activated;
    2> else if preconfiguredGapState is set to deactivated:
        3> consider the measurement gap configured in accordance with 5.5.2.9 as deactivated;
        3> if measGapSharingConfig is configured for this measurement gap configuration:
            4> consider the measurement gap sharing configured in accordance with 5.5.2.11 as deactivated;
    2> if bwp-InactivityTimer associated with the active DL BWP expires and the active DL BWP is switched to default DL BWP or initial DL BWP as defined in TS 38.321 sub-clause 5.15.1:
        3> if defaultBWP-PreconfigurdGapState is set to activated:
            4> activates the measurement gap configured in accordance with 5.5.2.9;
            4> if measGapSharingConfig is configured for this measurement gap configuration:
                5> activates the measurement gap sharing configured in accordance with 5.5.2.11;
        3> else if defaultBWP-PreconfigurdGapState is set to deactivated:
            4> deactivates the measurement gap configured in accordance with 5.5.2.9;
            4> if measGapSharingConfig is configured for this measurement gap configuration:
                5> deactivates the measurement gap sharing configured in accordance with 5.5.2.11;
1> else if preconfiguredGap is set to release in GapConfig:
    2> consider that the activation and deactivation mechanism via preconfiguredGapState, DCI as defined in TS 38.212 or BWP switching by bwp-InactivityTimer as defined in TS 38.321 are not applied to the measurement gap configured in accordance with 5.5.2.9 (i.e. the configured gap is always activated unless it is released).

APPARATUS, BASE STATION, AND COMMUNICATION METHOD FOR APPLYING A SHARING SCHEME TO PRE-CONFIGURED MEASUREMENT GAP

CROSS-REFERENCE TO RELATED APPLICATIONS

This application is a continuation application of International Patent Application No. PCT/JP2022/038775, filed on Oct. 18, 2022, which designated the U.S. and claims the benefit of priority from Japanese Patent Application No. 2021-171755, filed on Oct. 20, 2021. The entire disclosures of all of the above applications are incorporated herein by reference.

BACKGROUND

1. Technical Field

The present disclosure relates to an apparatus, a base station, and a communication method.

2. Related Art

In 3rd Generation Partnership Project (3GPP) Release 17, a work item for Measurement Gap Enhancements has been launched to make more efficient the function of radio resource management (RRM) in a user equipment (UE) and a network (RP-211591).

SUMMARY

An apparatus according to an aspect of the present disclosure, includes: a memory storing a program; and one or more processors configured to execute the program to: receive a radio resource control, RRC, message including first configuration information and second configuration information, the first configuration information including information for indicating that a measurement gap is a pre-configured measurement gap and information on sharing of the pre-configured measurement gap, the second configuration information including information for indicating that the pre-configured measurement gap is activated or deactivated; activate or deactivate, based on switching of a downlink bandwidth part, BWP, the pre-configured measurement gap according to the information for indicating that the pre-configured measurement gap is activated or deactivated included in the second configuration information in a case where the first configuration information includes the information for indicating that the measurement gap is the pre-configured measurement gap; and apply a sharing scheme based on the information on the sharing of the pre-configured measurement gap to the activated pre-configured measurement gap in a case where the pre-configured measurement gap is activated.

A base station according to an aspect of the present disclosure, includes: a memory storing a program; and one or more processors configured to execute the program to transmit a radio resource control, RRC, message including first configuration information and second configuration information, the first configuration information including information for indicating that a measurement gap is a pre-configured measurement gap and information on sharing of the pre-configured measurement gap, the second configuration information including information for indicating that the pre-configured measurement gap is activated or deactivated, wherein the pre-configured measurement gap is activated or deactivated, based on switching of a downlink bandwidth part, BWP, according to the information for indicating that the pre-configured measurement gap is activated or deactivated included in the second configuration information in a case where the first configuration information includes the information for indicating that the measurement gap is the pre-configured measurement gap, and a sharing scheme based on the information on the sharing of the pre-configured measurement gap is applied to the activated pre-configured measurement gap in a case where the pre-configured measurement gap is activated.

A communication method of an apparatus according to an aspect of the present disclosure, includes: receiving a radio resource control, RRC, message including first configuration information and second configuration information, the first configuration information including information for indicating that a measurement gap is a pre-configured measurement gap and information on sharing of the pre-configured measurement gap, the second configuration information including information for indicating that the pre-configured measurement gap is activated or deactivated; activating or deactivating, based on switching of a downlink bandwidth part, BWP, the pre-configured measurement gap according to the information for indicating that the pre-configured measurement gap is activated or deactivated included in the second configuration information in a case where the first configuration information includes the information for indicating that the measurement gap is the pre-configured measurement gap; and applying a sharing scheme based on the information on the sharing of the pre-configured measurement gap to the activated pre-configured measurement gap in a case where the pre-configured measurement gap is activated.

BRIEF DESCRIPTION OF THE DRAWINGS

FIG. 7 is a diagram for explaining an example of MG configuration information according to a first embodiment of the present disclosure.

FIG. 8 is a diagram for explaining examples of common configuration information and P-MG configuration information included in the MG configuration information according to the first embodiment of the present disclosure.

FIG. 11 is a diagram for explaining a specific example of an MG configuration according to the first embodiment of the present disclosure.

FIG. 12 is a diagram for explaining examples of P-MG configuration information and P-MG status information included in MG configuration information according to a first modification example of the first embodiment of the present disclosure.

FIG. 13 is a diagram for explaining a specific example of an MG configuration according to the first modification example of the first embodiment of the present disclosure.

FIG. 16 is a diagram for explaining a specific example of an MG configuration according to the first operation example of the second embodiment of the present disclosure.

FIG. 17 is a diagram for explaining an example of MG configuration information according to a second operation example of the second embodiment of the present disclosure.

FIG. 19 is a diagram for explaining a specific example of an MG configuration according to the second operation example of the second embodiment of the present disclosure.

FIG. 22 is a diagram for explaining an example of the activation status determination of MG sharing according to the third embodiment of the present disclosure.

FIG. 23 is a diagram for explaining another example of the activation status determination of MG sharing according to the third embodiment of the present disclosure.

DETAILED DESCRIPTION OF THE PREFERRED EMBODIMENTS

Figure 1:
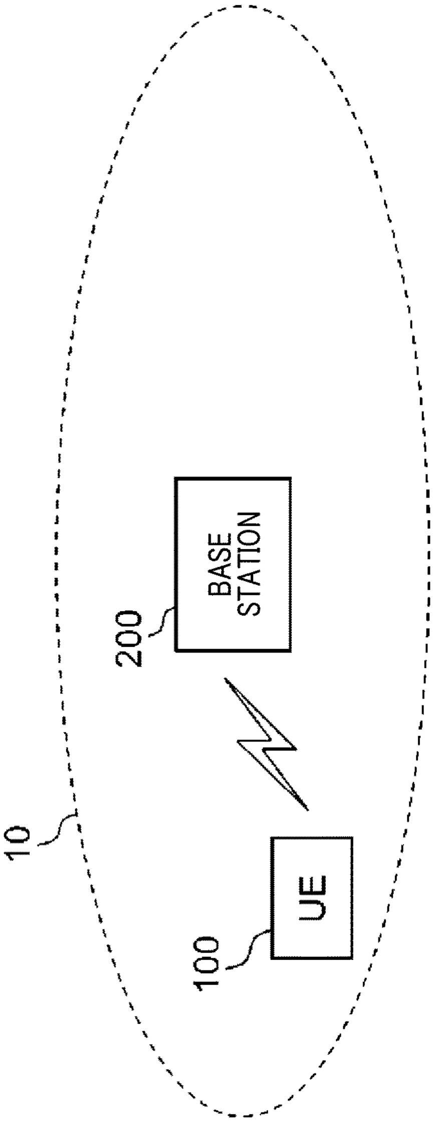
FIG. 1 is an explanatory diagram illustrating an example of a schematic configuration of a system according to embodiments of the present disclosure.

For example, RP-212311, R4-2115438, R4-2115340, R4-2115398, and R4-2108034 describe discussions about signaling and procedures associated with pre-configured measurement gaps (P-MGs) different from legacy measurement gaps (MGs). A P-MG is capable of activation or deactivation unlike a legacy MG.

In particular, R4-2115398 describes a discussion about the relationship between the legacy MG and the P-MG and discussion about criteria for activating or deactivating the P-MG.

In addition, the current technical specifications (TSs) define a scheme for sharing an MG (3GPP TS 38.331 V16.6.0). In MG sharing, an MG is shared in the case of duplicate MGs. MG sharing may be configured along with the configuration of an MG. The configuration of MG sharing may be discarded along with the discard of the configuration of an MG.

A detailed study by the inventors has revealed the following issue. That is, it may be impossible to apply MG sharing to a P-MG that may have the status of activation or deactivation. However, nothing is currently under consideration about the configuration of MG sharing for a P-MG.

An object of the present disclosure is to provide an apparatus, a base station, and a method that each make it possible to apply MG sharing to an MG which may have the status of activation or deactivation.

An apparatus (100) according to an aspect of the present disclosure includes: a communication processing unit (135) configured to receive a radio resource control, RRC, message including information for indicating that a measurement gap is a pre-configured measurement gap, information for indicating whether the pre-configured measurement gap is activated, and information associated with sharing of the measurement gap; and a control unit (133) configured to apply sharing of the measurement gap based on the information associated with the sharing of the measurement gap to the pre-configured measurement gap in a case where the pre-configured measurement gap is activated based on the information for indicating whether the pre-configured measurement gap is activated.

A base station (200) according to an aspect of the present disclosure includes: a communication processing unit (245) configured to transmit a radio resource control, RRC, message including information for indicating that a measurement gap is a pre-configured measurement gap, information for indicating whether the pre-configured measurement gap is activated, and information associated with sharing of the measurement gap; and a control unit (243) configured to apply sharing of the measurement gap based on the information associated with the sharing of the measurement gap to the pre-configured measurement gap in a case where the pre-configured measurement gap is activated based on the information for indicating whether the pre-configured measurement gap is activated.

A method performed by an apparatus (100) according to an aspect of the present disclosure includes: receiving a radio resource control, RRC, message including information for indicating that a measurement gap is a pre-configured measurement gap, information for indicating whether the pre-configured measurement gap is activated, and information associated with sharing of the measurement gap; and applying sharing of the measurement gap based on the information associated with the sharing of the measurement gap to the pre-configured measurement gap in a case where the pre-configured measurement gap is activated based on the information for indicating whether the pre-configured measurement gap is activated.

A method performed by a base station (200) according to an aspect of the present disclosure includes: transmitting a radio resource control, RRC, message including information for indicating that a measurement gap is a pre-configured measurement gap, information for indicating whether the pre-configured measurement gap is activated, and information associated with sharing of the measurement gap; and applying sharing of the measurement gap based on the information associated with the sharing of the measurement gap to the pre-configured measurement gap in a case where the pre-configured measurement gap is activated based on the information for indicating whether the pre-configured measurement gap is activated.

According to the present disclosure, it is possible to apply MG sharing to an MG that may have the status of activation or deactivation. Note that, instead of or in addition to this advantageous effect, the present disclosure may yield another advantageous effect.

Hereinafter, embodiments of the present disclosure will be described in detail with reference to the appended drawings. In the present specification and the drawings, elements to which similar descriptions are applicable are denoted with the same reference signs, thereby omitting duplicate descriptions.

Descriptions will be given in the following order:

1. Configuration of System
2. Configuration of User Equipment
3. Configuration of Base Station
4. First Embodiment (MG Configuration Information for P-MG)
5. Second Embodiment (Management of Activation Status of MG)
6. Third Embodiment (Activation Synchronization of MG and MG Sharing)

1. Configuration of System

An example of a configuration of a system 1 according to embodiments of the present disclosure will be described with reference to FIG. 1. Referring to FIG. 1, the system 1 includes a user equipment 100 and a base station 200.

For example, the system 1 is a system compliant with TSs in 3GPP. More specifically, for example, the system 1 is a system compliant with the TSs of 5G or new radio (NR). Naturally, the system 1 is not limited to this example. The system 1 may be a system compliant with other TSs in 3GPP. As an example, the system 1 may be a system compliant with the TSs of LTE, LTE advanced (LTE-A), or 4G and the base station 200 may be an evolved node B (eNB). Alternatively, the base station 200 may be an ng-eNB. As another example, the system 1 may be a system compliant with the TSs of 3G and the base station 200 may be a Node B. As yet another example, the system 1 may be a system compliant with next generation (for example, 6G) TSs. Alternatively, the system 1 may be a system compliant with TSs of another standards organization for mobile communications.

(1) UE 100

The UE 100 communicates with a base station. For example, the UE 100 communicates with the base station 200 in a case where the UE 100 is located within a coverage area 10 of the base station 200.

For example, the UE 100 communicates with a base station (for example, base station 200) by using a radio access network (RAN) protocol stack. For example, the protocol stack includes protocols of radio resource control (RRC), service data adaptation protocol (SDAP), packet data convergence protocol (PDCP), radio link control (RLC), medium access control (MAC), and physical (PHY) layers. Alternatively, the protocol stack does not have to include all of these protocols, but may include some of these protocols.

In addition, the UE 100 measures a signal transmitted from a base station by using an MG. The MG is configured for an inter-frequency measurement, an inter-system measurement, or an intra-frequency measurement. The UE 100 measures a signal by switching frequencies or systems in the period of the configured MG.

Figure 2:
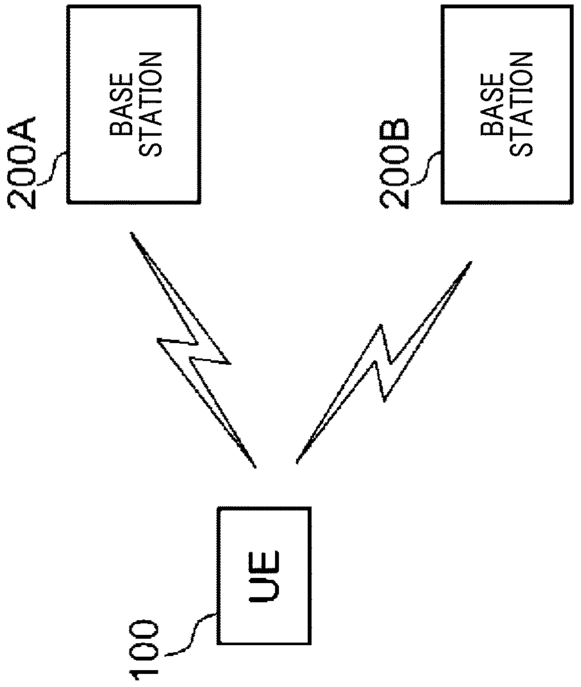
FIG. 2 is an explanatory diagram for explaining an example in which a user equipment according to embodiments of the present disclosure measures a signal by using an MG.

For example, referring to the example of FIG. 2, it is possible for the UE 100 to measure a signal from a base station 200B different from a connected base station 200A in communication frequency. Specifically, the UE 100 refrains from communicating with the base station 200A and receives a signal transmitted from the base station 200B to measure the reception quality of the signal in the period of the configured MG. For example, in a case where the reception quality of a signal from the base station 200B is higher than the reception quality of a signal from the base station 200A, the UE 100 may switch the connection from the base station 200A to the base station 200B.

(2) Base Station 200

The base station 200 is a node in an RAN and communicates with a UE (for example, UE 100) located within the coverage area 10 of the base station 200.

For example, the base station 200 communicates with a UE (for example, UE 100) by using the protocol stack.

For example, the base station 200 is a gNB. The gNB is a node that provides NR user plane and control plane protocol terminations towards a UE and is connected to a 5G core network (5GC) through an NG interface. Alternatively, the base station 200 may be an en-gNB. The en-gNB is a node that provides NR user plane and control plane protocol terminations toward a UE and operates as a secondary node in E-UTRA-NR dual connectivity (EN-DC).

The base station 200 may include a plurality of nodes. The plurality of nodes may include a first node that hosts higher layers included in the protocol stack and a second node that hosts lower layers included in the protocol stack. The higher layers may include the RRC layer, the SDAP layer, and the PDCP layer, while the lower layers may include the RLC layer, the MAC layer, and the PHY layer. The first node may be a central unit (CU) and the second node may be a distributed unit (DU). Note that the plurality of nodes may include a third node that performs lower-level processing of the PHY layer and the second node may perform higher-level processing of the PHY layer. The third node may be a radio unit (RU).

Alternatively, the base station 200 may be one of the plurality of nodes and may be connected to another unit of the plurality of nodes.

The base station 200 may be an integrated access and backhaul (IAB) donor or an IAB node.

2. Configuration of User Equipment

Figure 3:
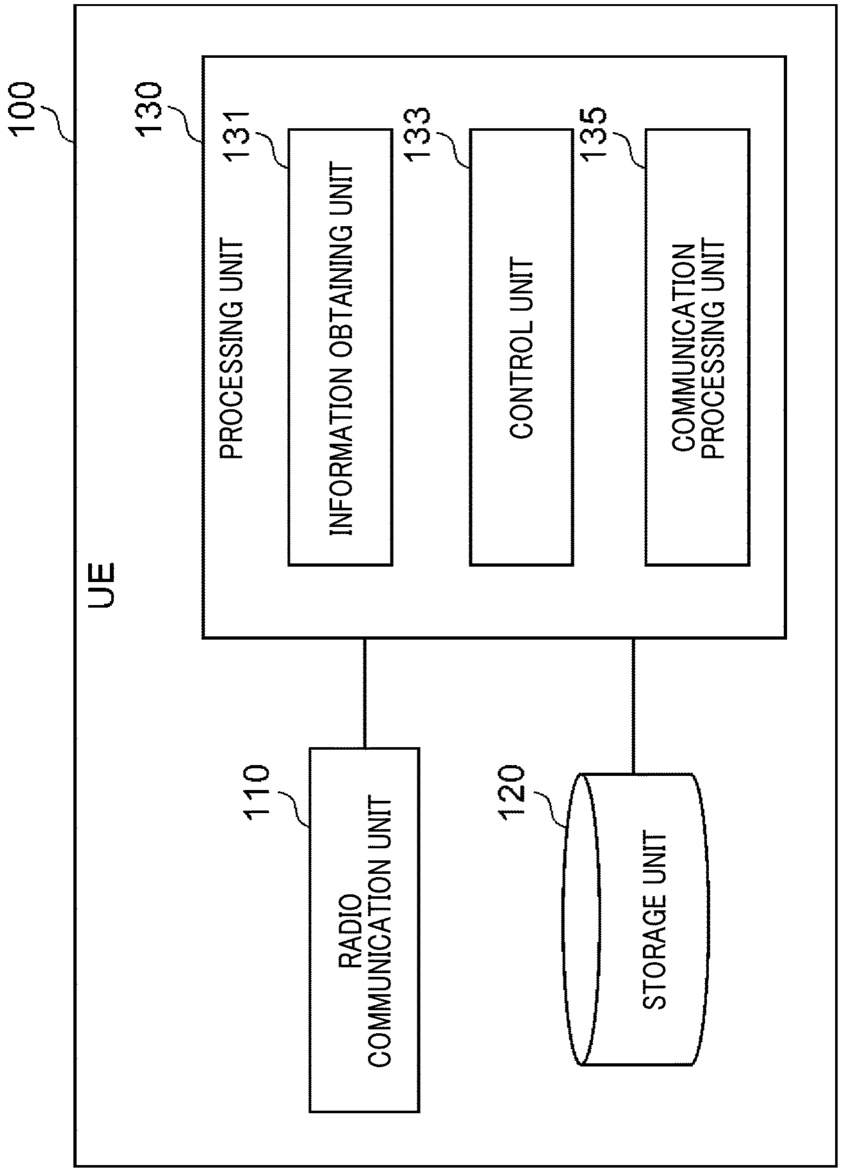
FIG. 3 is a block diagram illustrating an example of a schematic functional configuration of the user equipment according to embodiments of the present disclosure.
Figure 4:
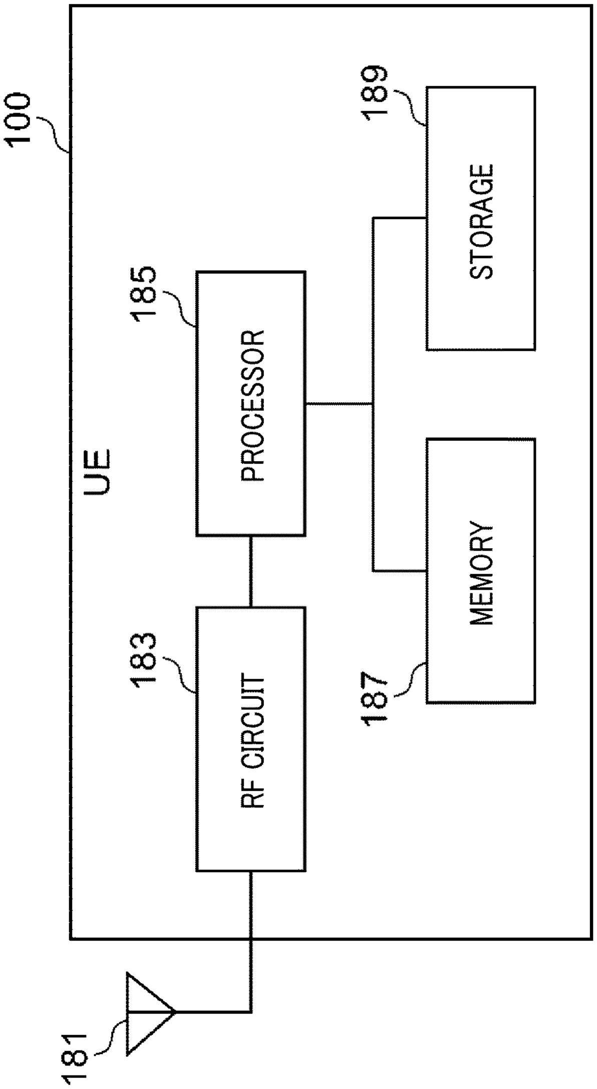
FIG. 4 is a block diagram illustrating an example of a schematic hardware configuration of the user equipment according to embodiments of the present disclosure.

An example of a configuration of the UE 100 according to embodiments of the present disclosure will be described with reference to FIGS. 3 and 4.

(1) Functional Configuration

First, an example of a functional configuration of the UE 100 according to embodiments of the present disclosure will be described with reference to FIG. 3. Referring to FIG. 3, the UE 100 includes a radio communication unit 110, a storage unit 120, and a processing unit 130.

The radio communication unit 110 wirelessly transmits and receives signals. For example, the radio communication unit 110 receives a signal from a base station and transmits a signal to the base station. For example, the radio communication unit 110 receives a signal from another UE and transmits a signal to the other UE.

The storage unit 120 stores various kinds of information for the UE 100.

The processing unit 130 provides various functions of the UE 100. The processing unit 130 includes an information obtaining unit 131, a control unit 133, and a communication processing unit 135. Note that the processing unit 130 may further include other components in addition to these components. That is, the processing unit 130 may also perform an operation other than operations of these components. Specific operations of the information obtaining unit 131, the control unit 133, and the communication processing unit 135 will be described in detail below.

For example, the processing unit 130 (communication processing unit 135) communicates with a base station (for example, base station 200) or another UE through the radio communication unit 110.

(2) Hardware Configuration

Next, an example of a hardware configuration of the UE 100 according to embodiments of the present disclosure will be described with reference to FIG. 4. Referring to FIG. 4, the UE 100 includes an antenna 181, a radio frequency (RF) circuit 183, a processor 185, a memory 187, and a storage 189.

The antenna 181 converts signals into radio waves and emits the radio waves into the air. In addition, the antenna 181 receives radio waves in the air and converts the radio waves into signals. The antenna 181 may include a transmitting antenna and a receiving antenna or may be a single antenna for transmission and reception. The antenna 181 may be a directional antenna and may include a plurality of antenna elements.

The RF circuit 183 performs analog processing on signals that are transmitted and received through the antenna 181. The RF circuit 183 may include a high-frequency filter, an amplifier, a modulator, a lowpass filter, and the like.

The processor 185 performs digital processing on signals that are transmitted and received through the antenna 181 and the RF circuit 183. The digital processing includes processing of the RAN protocol stack. The processor 185 may include a plurality of processors or may be a single processor. The plurality of processors may include a baseband processor that performs the digital processing and one or more processors that perform other processing.

The memory 187 stores a program to be performed by the processor 185, a parameter associated with the program, and other various kinds of information. The memory 187 may include at least one of a read only memory (ROM), an erasable programmable read only memory (EPROM), an electrically erasable programmable read only memory (EEPROM), a random access memory (RAM), and a flash memory. All or part of the memory 187 may be included in the processor 185.

The storage 189 stores various kinds of information. The storage 189 may include at least one of a solid state drive (SSD) and a hard disc drive (HDD).

The radio communication unit 110 may be implemented by the antenna 181 and the RF circuit 183. The storage unit 120 may be implemented by the storage 189. The processing unit 130 may be implemented by the processor 185 and the memory 187.

The processing unit 130 may be implemented by a system on a chip (SoC) including the processor 185 and the memory 187. The SoC may include the RF circuit 183 and the radio communication unit 110 may also be implemented by the SoC.

Given the hardware configuration described above, the UE 100 may include a memory (that is, memory 187) that stores a program and one or more processors (that is, processor 185) capable of executing the program and the one or more processors may perform operations of the processing unit 130 by executing the program. The program may be a program for causing the processors to perform the operations of the processing unit 130.

3. Configuration of Base Station

Figure 5:
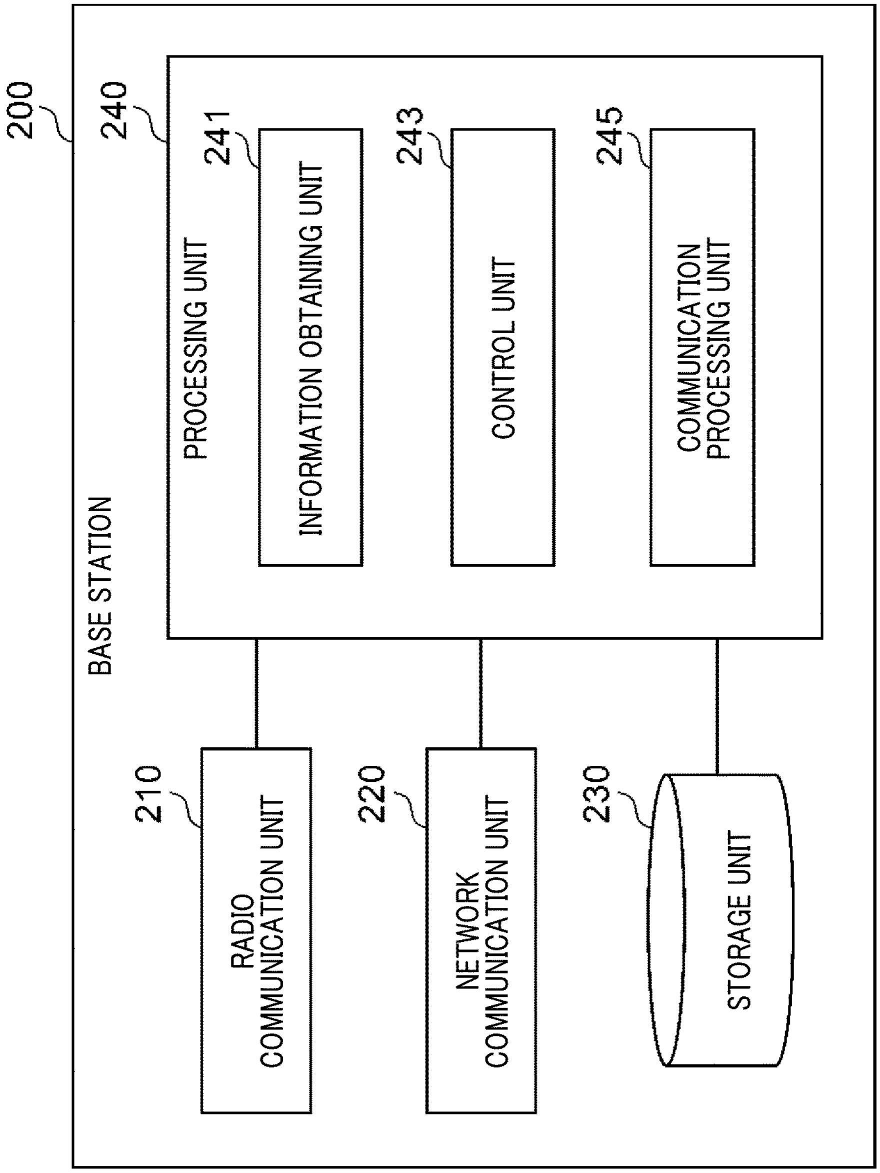
FIG. 5 is a block diagram illustrating an example of a schematic functional configuration of a base station according to embodiments of the present disclosure.
Figure 6:
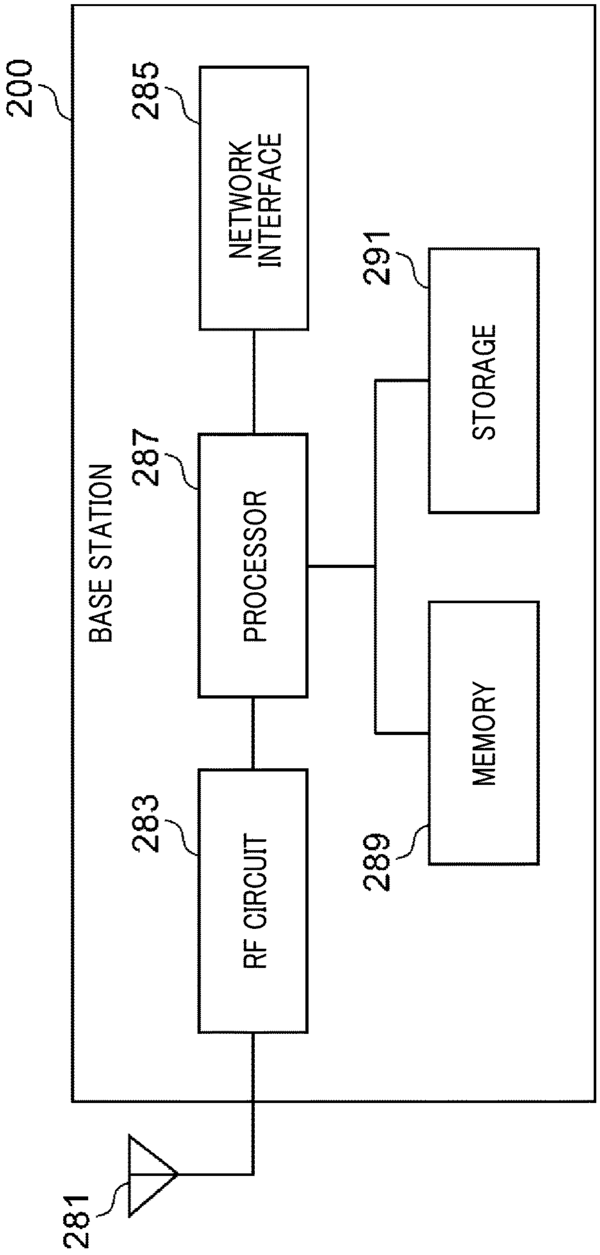
FIG. 6 is a block diagram illustrating an example of a schematic hardware configuration of the base station according to embodiments of the present disclosure.

An example of a configuration of the base station 200 according to embodiments of the present disclosure will be described with reference to FIGS. 5 and 6.

(1) Functional Configuration

First, an example of a functional configuration of the base station 200 according to embodiments of the present disclosure will be described with reference to FIG. 5. Referring to FIG. 5, the base station 200 includes a radio communication unit 210, a network communication unit 220, a storage unit 230, and a processing unit 240.

The radio communication unit 210 wirelessly transmits and receives signals. For example, the radio communication unit 210 receives a signal from a UE and transmits a signal to the UE.

The network communication unit 220 receives a signal from a network and transmits a signal to the network.

The storage unit 230 stores various kinds of information for the base station 200.

The processing unit 240 provides various functions of the base station 200. The processing unit 240 includes an information obtaining unit 241, a control unit 243, and a communication processing unit 245. Note that the processing unit 240 may further include other components in addition to these components. That is, the processing unit 240 may also perform an operation other than operations of these components. Specific operations of the information obtaining unit 241, the control unit 243, and the communication processing unit 245 will be described in detail below.

For example, the processing unit 240 (communication processing unit 245) communicates with a UE (for example, UE 100) through the radio communication unit 210. For example, the processing unit 240 (communication processing unit 245) communicates with another node (for example, a network node within a core network or another base station) through the network communication unit 220.

(2) Hardware Configuration

Next, an example of a hardware configuration of the base station 200 according to embodiments of the present disclosure will be described with reference to FIG. 6. Referring to FIG. 6, the base station 200 includes an antenna 281, an RF circuit 283, a network interface 285, a processor 287, a memory 289, and a storage 291.

The antenna 281 converts signals into radio waves and emits the radio waves into the air. In addition, the antenna 281 receives radio waves in the air and converts the radio waves into signals. The antenna 281 may include a transmitting antenna and a receiving antenna or may be a single antenna for transmission and reception. The antenna 281 may be a directional antenna and may include a plurality of antenna elements.

The RF circuit 283 performs analog processing on signals that are transmitted and received through the antenna 281. The RF circuit 283 may include a high-frequency filter, an amplifier, a modulator, a lowpass filter, and the like.

The network interface 285 is, for example, a network adaptor, and transmits a signal to a network and receives a signal from the network.

The processor 287 performs digital processing on signals that are transmitted and received through the antenna 281 and the RF circuit 283. The digital processing includes processing of the RAN protocol stack. The processor 287 also performs processing on signals that are transmitted and received through the network interface 285. The processor 287 may include a plurality of processors or may be a single processor. The plurality of processors may include a baseband processor that performs the digital processing and one or more processors that perform other processing.

The memory 289 stores a program to be performed by the processor 287, a parameter associated with the program, and other various kinds of information. The memory 289 may include at least one of a ROM, an EPROM, an EEPROM, a RAM, and a flash memory. All or part of the memory 289 may be included in the processor 287.

The storage 291 stores various kinds of information. The storage 291 may include at least one of an SSD and an HDD.

The radio communication unit 210 may be implemented by the antenna 281 and the RF circuit 283. The network communication unit 220 may be implemented by the network interface 285. The storage unit 230 may be implemented by the storage 291. The processing unit 240 may be implemented by the processor 287 and the memory 289.

Part or all of the processing unit 240 may be virtualized. In other words, part or all of the processing unit 240 may be implemented as a virtual machine. In this case, part or all of the processing unit 240 may operate as a virtual machine on a physical machine (that is, hardware) including a processor, a memory, and the like and a hypervisor.

Given the hardware configuration described above, the base station 200 may include a memory (that is, memory 289) that stores a program and one or more processors (that is, processor 287) capable of executing the program and the one or more processors may perform operations of the processing unit 240 by executing the program. The program may be a program for causing the processors to perform the operations of the processing unit 240.

4. First Embodiment

A first embodiment of the present disclosure will be described. In the first embodiment, MG configuration information for a legacy MG is shared and used for MG configuration information for a P-MG.

4-1. Operation Examples

Examples of operations of the UE 100 and the base station 200 according to the first embodiment of the present disclosure will be described with reference to FIGS. 7 to 10.

(1) Operation of UE 100

The UE 100 receives MG configuration information from the base station 200. The UE 100 sets an MG based on common configuration information and P-MG configuration information included in the received MG configuration information. The following describes an operation of the UE 100 and relevant information in detail.

(1-1) Reception of MG Configuration Information

The UE 100 receives MG configuration information from the base station 200. Specifically, the UE 100 (communication processing unit 135) receives an RRC message including the MG configuration information from the base station 200. The UE 100 (information obtaining unit 131) obtains the MG configuration information included in the RRC message.

The MG configuration information includes common configuration information used for a legacy MG (first MG) and a P-MG (second MG) and P-MG configuration information indicating that a P-MG is configured. Specifically, in a case where a P-MG is configured, the P-MG configuration information indicates activation or deactivation of the P-MG. In contrast, in a case where no P-MG is configured, the P-MG configuration information indicates that no P-MG is configured.

For example, the MG configuration information is MeasGapConfig that is an RRC information element (IE). In addition, the common configuration information includes at least one of parameters included in GapConfig configured in MeasGapConfig. In addition, the P-MG configuration information is included in GapConfig. MeasGapConfig indicates whether or not an MG is configured and may have the value of setup or release.

Referring to information 21 in FIG. 7, MeasGapConfig includes parameters such as gapUE, gapFR1, and gapFR2. The parameters are configuration presence or absence parameters each indicating for each MG configuration unit whether or not an MG is configured. The parameter may have the value of setup or release. In a case where gapUE is setup, an MG is configured per UE. In a case where gapFR1 and gapFR2 are setup, an MG is configured per frequency range (FR). In a case where a configuration presence or absence parameter is setup, GapConfig that is an IE is configured as a value. An MG configuration parameter for each unit is included in GapConfig.

Referring to information 23 in FIG. 8, GapConfig includes parameters such as gapOffset, mgl, mgrp, mgta, refServCellIndicator, refFR2ServCellAsyncCA-r16, and mgl-r16 as the common configuration information. gapOffset indicates an offset of a gap pattern with a measurement gap repetition period (MGRP). mgl and mgl-r16 each indicate MG length, that is, measurement gap length (MGP). mgrp indicates an MG repetition period, that is, an MGRP. mgta indicates a timing advance of MG. refServCellIndicator and refFR2ServCellAsyncCA-r16 each indicate a system frame number (SFN) and a subframe of a serving cell used for MG calculation. The parameters serving as the common configuration information may be used for both the legacy MG and the P-MG. Note that the common configuration information may be at least one of the parameters.

In addition, GapConfig includes preconfiguredGap-r17 as the P-MG configuration information. preconfiguredGap-r17 indicates whether or not a P-MG is configured and may have the value of setup or release. In a case where preconfiguredGap-r17 is setup, a P-MG is configured. In other words, an MG is pre-configured. In this case, PreconfiguredGapConfig-r17 that is an IE is configured as a value. PreconfiguredGapConfig-r17 includes preconfiguredGapState-r17. preconfiguredGapState-r17 indicates whether or not the P-MG is activated or deactivated. preconfiguredGap-r17 serving as the P-MG configuration information is optional.

In this way, in a case where a P-MG is configured, the P-MG configuration information indicates activation or deactivation of the P-MG. This allows information indicating activation or deactivation of a P-MG to be included in the MG configuration information only in a case where the P-MG is configured. It is thus possible to make signaling more efficient. In addition, the management of activation or deactivation of the MG as a status makes it possible to control whether or not the MG is applied without discarding the configuration of the MG.

In addition, in a case where no P-MG is configured, the P-MG configuration information indicates that no P-MG is configured. This makes it possible to explicitly indicate that no P-MG is configured. In addition, it is possible to explicitly indicate whether an MG to be applied is a legacy MG or a P-MG. This may suppress the inconsistency of the MG configuration information between the UE 100 and the base station 200.

In addition, the MG configuration information is MeasGapConfig. The common configuration information includes at least one of the parameters included in GapConfig configured in MeasGapConfig. The P-MG configuration information is included in GapConfig. This makes it possible to transmit the P-MG configuration information to the UE 100 while using the MG configuration information used for a legacy MG. Further, the P-MG configuration information is optional and it is thus possible to keep the compatibility of the MG configuration information with the legacy MG.

An RRC message including the MG configuration information may be an RRCReconfiguration message or an RRCResume message.

This makes it possible to transmit the MG configuration information including the P-MG configuration information from the base station 200 to the UE 100 by using the existing signaling between the UE and the base station. It is thus possible to prevent new signaling from being added.

Note that the RRC message including the MG configuration information including the P-MG configuration information may be an RRC message which is additionally defined and used for transmitting the MG configuration information including the P-MG configuration information. In this case, it is possible to transmit the MG configuration information including the P-MG configuration information to the UE 100 without modifying the existing RRC message.

(1-2) Setting of MG

The UE 100 sets an MG based on MG configuration information. Specifically, the UE 100 (control unit 133) sets a legacy MG or a P-MG based on the MG configuration information included in an RRC message received from the base station 200.

More specifically, in a case where P-MG configuration information included in the MG configuration information indicates that a P-MG is configured, the UE 100 sets a P-MG. In contrast, in a case where the P-MG configuration information indicates that no P-MG is configured, the UE 100 sets a legacy MG.

For example, in a case where preconfiguredGap-r17 included in Gapconfig illustrated in FIG. 8 is setup, the UE 100 sets a P-MG. That is, PreconfiguredGapConfig-r17 including preconfiguredGapState-r17 that is set to activation or deactivation as a parameter is set.

In addition, in a case where preconfiguredGap-r17 is release, the UE 100 sets a legacy MG. PreconfiguredGapConfig-r17 is not therefore set. That is, the mechanism of a P-MG is not applied to an MG. The MG is not thus controlled by using the activation status. In other words, it can be said that the MG is always in the activated status. In this way, in a case where the P-MG configuration information indicates that no P-MG is configured, a legacy MG is set to allow the compatibility with a legacy MG to be kept.

(2) Operation of Base Station 200

The base station 200 configures any of a legacy MG and a P-MG. The base station 200 transmits MG configuration information including common configuration information and P-MG configuration information to the UE 100. The following describes an operation of the base station 200 and relevant information in detail. Note that the contents which are substantially the same as the description of an operation of the UE 100 will not be described in detail.

(2-1) Configuration of MG

The base station 200 configures any of a legacy MG and a P-MG. Specifically, the base station 200 (control unit 243) selectively configures a legacy MG or a P-MG based on a condition. A legacy MG or a P-MG is selectively configured, for example, based on the presence or absence of an MG configuration request from the UE 100, the adaptability of the UE 100 to a P-MG, the capability of the UE 100 for a P-MG, or the like.

The base station 200 performs configuring for common configuration information and P-MG configuration information. For example, the base station 200 configures MeasGapConfig as MG configuration information, configures one of the parameters included in GapConfig as common configuration information, and configures preconfiguredGap-r17 as P-MG configuration information.

Further, in a case where a P-MG is configured, the base station 200 sets preconfiguredGap-r17 to setup and configures PreconfiguredGapConfig-r17 including preconfiguredGapState-r17 set to activation or deactivation as a parameter. In addition, in a case where no P-MG is configured, the base station 200 sets preconfiguredGap-r17 to release.

(2-2) Transmission of MG Configuration Information

The base station 200 transmits MG configuration information to the UE 100. Specifically, the base station 200 (information obtaining unit 241) obtains the MG configuration information. The base station 200 (communication processing unit 245) transmits an RRC message including the obtained MG configuration information to the UE 100.

For example, the base station 200 transmits an RRC message including MG configuration information including common configuration information for a configured MG and P-MG configuration information to the UE 100. For example, the RRC message including the MG configuration information may be an RRCReconfiguration message or an RRCResume message.

(3) Flow of Processing

Figure 9:
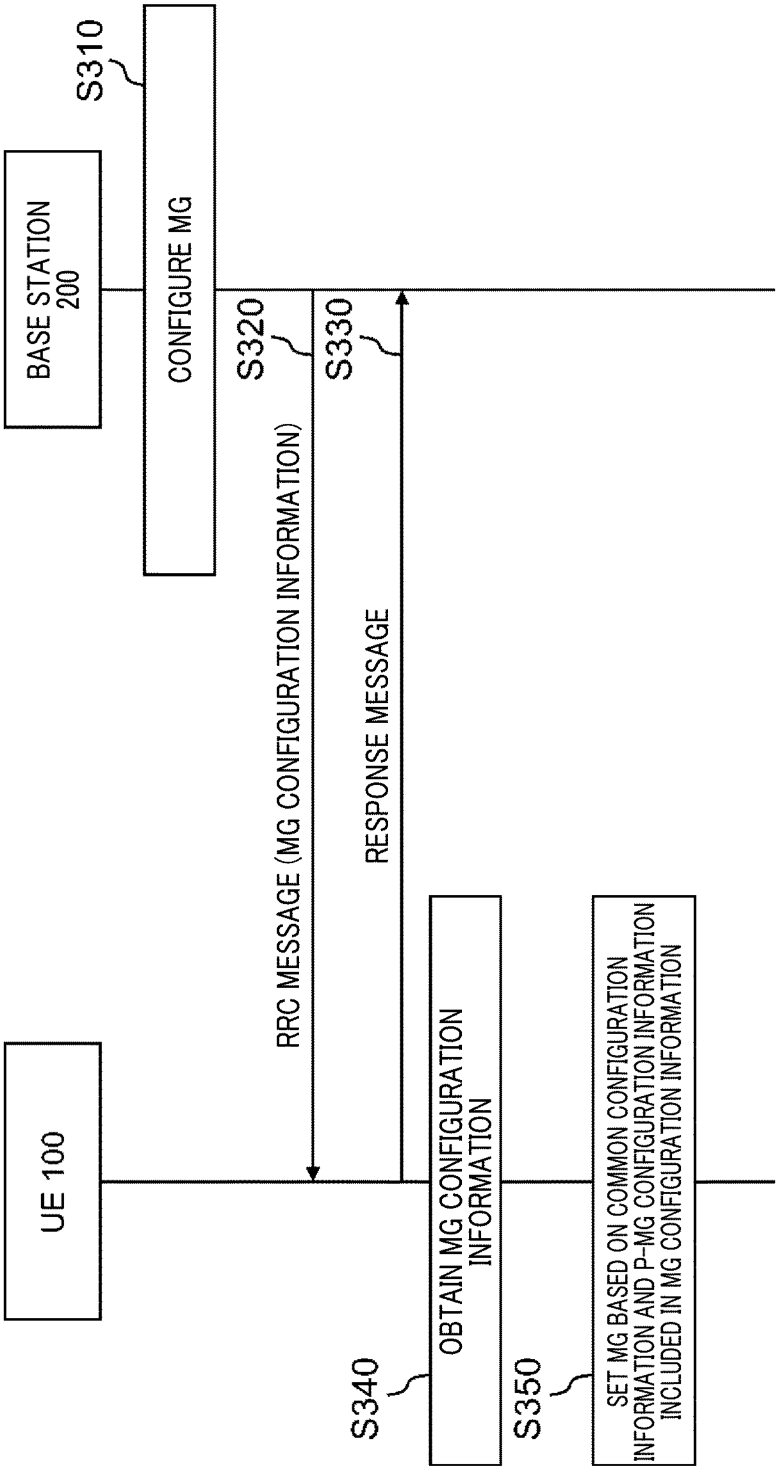
FIG. 9 is a diagram for explaining an example of a schematic flow of processing according to the first embodiment of the present disclosure.

An example of processing according to the first embodiment of the present disclosure will be described with reference to FIGS. 9 and 10.

An example of a schematic flow of processing of the system 1 according to the first embodiment of the present disclosure will be first described with reference to FIG. 9.

The base station 200 configures an MG (S310). For example, the base station 200 configures a P-MG. That is, configuring is performed for common configuration information and P-MG configuration information.

The base station 200 transmits an RRC message including MG configuration information to the UE 100 (S320). For example, the base station 200 transmits an RRCReconfiguration message or an RRCResume message including measGapConfig serving as the MG configuration information including the common configuration information and the P-MG configuration information to the UE 100.

The UE 100 transmits a response message to the base station 200 in response to the received RRC message (S330). For example, when the UE 100 receives the RRCReconfiguration message or the RRCResume message including measGapConfig from the base station 200, the UE 100 transmits an RRCReconfigurationComp message or an RRCResumeComp message to the base station 200. Note that, in a case where the activation status of the P-MG is changed at this timing, the response message may include information indicating the activation status of the P-MG (that is, information indicating activation or deactivation).

The UE 100 obtains the MG configuration information from the received RRC message (S340). For example, the UE 100 obtains measGapConfig from the received RRCReconfiguration message or RRCResume message as the MG configuration information.

The UE 100 sets an MG based on common configuration information and P-MG configuration information included in the obtained MG configuration information (S350). For example, the UE 100 sets any of a legacy MG or a P-MG based on the P-MG configuration information included in obtained measGapConfig. The MG setting will be described in detail below with reference to FIG. 10.

Subsequently, an example of a schematic flow of the MG setting by the UE 100 according to the first embodiment of the present disclosure will be described with reference to FIG. 10.

The UE 100 determines whether or not P-MG configuration information indicates release (S410). For example, the UE 100 determines whether preconfiguredGap-r17 included in GapConfig set as the value of the parameter of any of gapUE, gapFR1, or gapFR2 set to setup in measGapConfig is setup or release.

In a case where the P-MG configuration information does not indicate release, the UE 100 determines whether or not the P-MG configuration information indicates activated (S420). For example, in a case where preconfiguredGap-r17 is setup, the UE 100 determines whether preconfiguredGap-State-r17 included in PreconfiguredGapConfig-r17 set as the value of preconfiguredGap-r17 is activated or deactivated.

In a case where the P-MG configuration information indicates activated, the UE 100 sets an MG to the activated status (S430). For example, in a case where preconfigured-GapState-r17 is activated, the UE 100 sets an MG whose activation status is activated. In other words, the UE 100 comes into operation on the assumption that the P-MG is activated.

In a case where the P-MG configuration information does not indicate activated, the UE 100 sets an MG to the deactivated status (S440). In a case where preconfigured-GapState-r17 is deactivated, the UE 100 sets an MG whose activation status is deactivated. In other words, the UE 100 comes into operation on the assumption that the P-MG is deactivated.

In a case where the P-MG configuration information indicates release, the UE 100 sets a legacy MG (S450). For example, in a case where preconfiguredGap-r17 is release, the UE 100 sets a legacy MG. That is, PreconfiguredGap-Config-r17 is not set. In this case, the configuration of the MG in measGapConfig is kept on being applied as conventionally until measGapConfig is released.

Note that the P-MG configuration may be reflected in the TSs. Information 25 in FIG. 11 is an example of the reflection of the configuration of a P-MG in the TSs. Naturally, the mode of the reflection of the configuration of the P-MG in the TSs is not limited to this.

(4) Advantageous Effects

In this way, according to the first embodiment of the present disclosure, an RRC message including MG configuration information is transmitted from a base station to the UE 100 and the MG configuration information includes common configuration information used for a legacy MG and a P-MG and P-MG configuration information indicating that a P-MG is configured. This makes it possible to distinguish, while using the same MG configuration information between the legacy MG and the P-MG, whether the MG configuration information is for the legacy MG or the P-MG. It is thus possible to avoid a conflict between the configurations of the two coexistent MGs. In addition, the use of the MG configuration information used for the legacy MG makes it possible to use the same MG configuration information for both the legacy MG and the P-MG. In other words, it can be said that the configuration of the legacy MG is transformable to the configuration of the P-MG or the configuration of the P-MG is transformable to the configuration of the legacy MG.

In addition, in a case where pieces of independent different MG configuration information are used between a legacy MG and a P-MG, an additional operation may be required to be defined to avoid a conflict between the configurations of the two MGs. For example, in a case where a P-MG is configured, a network (that is, base station) is required to perform control to prevent a legacy MG from being configured. Conversely, in a case where a legacy MG is configured, the network (that is, base station) is required to perform control to prevent a P-MG from being configured. In contrast, according to the first embodiment of the present disclosure, it is possible to avoid a conflict between the configurations of the two coexistent MGs without the additional operation as described above.

4-2. Modification Examples

First to third modification examples according to the first embodiment of the present disclosure will be described. Note that two or more of these modification examples may be combined.

(1) First Modification Example: Second Example of P-MG Configuration Information In the first embodiment of the present disclosure described above, in a case where a P-MG is configured, the P-MG configuration information indicates activation or deactivation of the P-MG. The P-MG configuration information according to the first embodiment of the present disclosure is not, however, limited to this example.

As the first modification example of the first embodiment of the present disclosure, information different from P-MG configuration information may indicate activation or deactivation of a P-MG.

Specifically, the P-MG configuration information indicates whether or not a P-MG is configured and P-MG status information different from the P-MG configuration information indicates activation or deactivation of the P-MG.

For example, referring to information 27 in FIG. 12, GapConfig includes, as parameters, preconfiguredGap-r17 as the P-MG configuration information and preconfigured-GapState-r17 as the P-MG status information. preconfiguredGap-r17 indicates whether or not a P-MG is configured and may have the value of TRUE or FALSE. preconfigured-GapState-r17 indicates whether the P-MG is activated or deactivated. In a case where preconfiguredGap-r17 is TRUE, preconfiguredGapState-r17 is configured.

An example of a flow of processing according to the present modification example will be described with reference to FIG. 10. Note that processing which is substantially the same as the processing according to the first embodiment of the present disclosure described above will not be described.

Instead of S410, the UE 100 determines whether or not the P-MG configuration information indicates TRUE. For example, the UE 100 determines whether preconfigured-Gap-r17 included in GapConfig is TRUE or FALSE.

In a case where the P-MG configuration information indicates TRUE, the UE 100 determines instead of S420 whether or not the P-MG status information indicates activated. For example, in a case where preconfiguredGap-r17 is TRUE, the UE 100 determines whether preconfigured-GapState-r17 is activated or deactivated.

In a case where the P-MG status information indicates activated, the UE 100 sets an MG in the activated status instead of S430.

In a case where the P-MG status information does not indicate activated, the UE 100 sets an MG in the deactivated status instead of S440.

In a case where the P-MG configuration information indicates FALSE, the UE 100 sets a legacy MG instead of S450.

Note that the configuration of a P-MG may be reflected in the TSs. Information 29 in FIG. 13 is an example of the reflection of the configuration of a P-MG in the TSs. Naturally, the mode of the reflection of the configuration of the P-MG in the TSs is not limited to this.

In this way, according to the first modification example of the first embodiment of the present disclosure, information different from P-MG configuration information indicates activation or deactivation of a P-MG. This makes it possible to control the activation status of the P-MG without keeping the P-MG configuration information held in the UE 100. In addition, the separation of the P-MG configuration information and the P-MG status information makes it possible to instruct the UE 100 about the activation status of the P-MG regardless of the configuration of the P-MG. For example, it is possible to issue an instruction about the activation status in the RRC layer or the PHY layer or change the activation status with another trigger (for example, timer-based BWP switching).

(2) Second Modification Example: Third Example of P-MG Configuration Information In the first embodiment of the present disclosure described above, the P-MG configuration information indicates whether or not a P-MG is configured. The P-MG configuration information according to the first embodiment of the present disclosure is not, however, limited to this example.

As the second modification example of the first embodiment of the present disclosure, P-MG configuration information may indicate whether or not a P-MG is configured based on the presence or absence of the P-MG configuration information.

Specifically, in a case where no P-MG is configured, the P-MG configuration information does not have to be included in MG configuration information. More specifically, the P-MG configuration information may be information indicating the activation status. For example, the P-MG configuration information may be preconfiguredGapState-r17 as illustrated in FIG. 8. In a case where a P-MG is configured, preconfiguredGapState-r17 is included in GapConfig. In a case where no P-MG is configured, preconfiguredGapState-r17 is not included in GapConfig.

In this way, according to the second modification example of the first embodiment of the present disclosure, the P-MG configuration information is not included in the MG configuration information in a case where no P-MG is configured. This makes it possible to suppress the amount of communication for signaling while indicating whether or not a P-MG is configured.

(3) Third Modification Example: Independent Configurations of Legacy MG and P-MG In the first embodiment of the present disclosure described above, the MG configuration information is shared between a legacy MG and a P-MG. The MG configuration information according to the first embodiment of the present disclosure is not, however, limited to this example.

As the third modification example of the first embodiment of the present disclosure, pieces of MG configuration information may be individually defined for a legacy MG and a P-MG.

Specifically, the MG configuration information for the legacy MG and the MG configuration information for the P-MG may be independently included in Measurement configuration information. For example, MeasConfig may include measGapConfig for the legacy MG and measGapConfig for the P-MG.

The MG configuration information for the legacy MG is legacy MG configuration information. The MG configuration information for the P-MG includes P-MG configuration information as described above in addition to the legacy MG configuration information.

Note that the MG configuration information for the P-MG may partially include the P-MG configuration information as described above. Specifically, information indicating the activation status of the P-MG alone may be included in the MG configuration information. For example, preconfiguredGapState-r17 alone may be included in GapConfig instead of preconfiguredGap-r17 illustrated in FIG. 8. Alternatively, the information indicating the activation status of the P-MG is not included in the MG configuration information, but may be included immediately below the Measurement configuration information. For example, preconfiguredGapState-r17 illustrated in FIG. 8 may be included immediately below MeasConfig in parallel with measGapConfig.

In configurating an MG, a network (that is, base station 200) configures only one MG. That is, the base station 200 generates only any one of MG configuration information for a legacy MG or MG configuration information for a P-MG.

Alternatively, the UE 100 may select one of the pieces of MG configuration information. For example, in a case where the MG configuration information for a legacy MG and the MG configuration information for a P-MG are included in the Measurement configuration information, the UE 100 may keep the MG configuration information for the P-MG and discard the legacy MG configuration information. Note that, in a case where only any one of the MG configuration information for the legacy MG and the MG configuration information for the P-MG is included, the MG is set based on the included MG configuration information.

In this way, according to the third modification example of the first embodiment of the present disclosure, pieces of MG configuration information are individually defined for a legacy MG and a P-MG. This makes it possible to independently manage the MG configuration information for the legacy MG and the MG configuration information for the P-MG. It is thus possible to easily apply different configurations to the legacy MG and the P-MG. For example, it is possible to distinguish and manage more easily the configuration that is used for only the P-MG or the configuration that is used for only the legacy MG.

5. Second Embodiment

A second embodiment of the present disclosure will be described. In the second embodiment, when the switching of a BWP occurs, the activation status of an MG is set in accordance with a BWP after the switching. Note that, in a case where a legacy MG and a P-MG coexist, the activation status of the P-MG is set in accordance with the BWP after the switching.

5-1. First Operation Example

A first operation example of the second embodiment of the present disclosure will be described. In the first operation example, the activation status of an MG is set in accordance with the requirement for an MG in a BWP after switching.

(1) Operation of UE 100

When BWP switching occurs, the UE 100 determines the requirement for an MG. The UE 100 sets the activation status of an MG in accordance with the requirement for an MG.

(1-1) Determination of Switching of BWP

The UE 100 determines whether or not the switching of a BWP occurs. Specifically, the UE 100 (control unit 133) determines whether or not timer-based BWP switching occurs.

More specifically, the UE 100 determines whether or not the timer associated with the BWP switching is expired. For example, the timer is a BWP inactivity timer.

When BWP switching occurs, the BWP is switched to a predetermined BWP. For example, the predetermined BWP is a default downlink (DL) BWP. In a case where the default DL BWP is not configured, the predetermined BWP may be an initial DL BWP. Note that the predetermined BWP may be a specific BWP other than the default DL BWP or the initial DL BWP.

(1-2) Determination of Requirement for MG

The UE 100 (control unit 133) determines the requirement for an MG in a BWP after switching. Specifically, the UE 100 determines the requirement for an MG based on conditions for determining the requirement for a legal MG. For example, the UE 100 determines the requirement for an MG based on conditions for deciding whether or not an MG is required for the Measurement described in 3GPP TS 38.300 (that is, gap-assisted or non-gap-assisted). In addition, the requirement for an MG is determined for the scheme of a Measurement based on a predetermined control signal. In other words, the predetermined control signal is a signal used for the Measurement.

More specifically, the requirement for an MG may be determined based on a report about the requirement for an MG in a BWP after switching from the UE 100. For example, in a case where the Measurement scheme is a synchronization signal block (SSB) based inter-frequency Measurement or an SSB based intra-frequency Measurement, the UE 100 determines the requirement for an MG in accordance with whether or not to report MG requirement information to the base station 200. In a case where the UE 100 reports the MG requirement information, the UE 100 determines that an MG is required. For example, the report is the transmission of an RRC message such as RRCReconfigurationComp or RRCResumeComp including the MG requirement information.

In addition, the requirement for an MG may be determined based on the capability of the UE 100 for a BWP after switching. For example, in a case where the Measurement scheme is an SSB based inter-frequency Measurement, the UE 100 determines the requirement for an MG in accordance with the type of MG supported by the UE 100 for the BWP after switching. In a case where the UE 100 supports only a per-UE MG, the UE 100 determines that an MG is required.

In addition, the requirement for an MG may be determined based on a frequency for a Measurement in a serving cell in the BWP after switching. For example, in a case where the Measurement scheme is an SSB based inter-frequency Measurement and the UE 100 supports a per-FR MG, the UE 100 determines the requirement for an MG in accordance with whether or not frequency ranges for Measurements in a plurality of serving cells are the same in the BWP after switching. In a case where frequency ranges for Measurements in the plurality of serving cells are the same, the UE 100 determines that an MG is required.

In addition, the requirement for an MG may be determined based on the frequency resource of the predetermined control signal in the BWP after switching. For example, in a case where the Measurement scheme is an SSB based intra-frequency Measurement, the UE 100 determines the requirement for an MG in accordance with whether the BWP after switching includes the frequency resource of an SSB associated with the initial DL BWP. In a case where the BWP after switching does not include the frequency resource of the SSB, the UE 100 determines that an MG is required.

Note that the Measurement scheme may be a cannel state information reference signal (CSI-RS) based inter-frequency Measurement.

In addition, some of the conditions described in TS 38.300 alone may be applied. In addition, the conditions for determining the requirement for an MG are not limited to the conditions described in TS 38.300 and may include another condition.

(1-3) Setting of Activation Status of MG

The UE 100 sets the activation status of an MG in accordance with the requirement for an MG. Specifically, the UE 100 (control unit 133) sets activation or deactivation of an MG in accordance with the requirement for an MG in a BWP after switching.

For example, in a case where an MG is required in the BWP after switching, the UE 100 activates an MG. That is, the status is set to activation. In a case where no MG is required in the BWP after switching, an MG is deactivated. That is, the status is set to deactivation.

(2) Operation of Base Station 200

When BWP switching occurs, the base station 200 determines the requirement for an MG. The base station 200 configures the activation status of an MG in accordance with the requirement for an MG. Note that the contents which are substantially the same as the description of an operation of the UE 100 will not be described in detail.

(2-1) Determination of Switching of BWP

The base station 200 determines whether or not the switching of a BWP occurs. Specifically, the base station 200 (control unit 243) determines whether or not timer-based BWP switching occurs. The determination of the timer-based BWP switching is substantially the same as the operation of the UE 100 and will not be thus described.

(2-2) Determination of Requirement for MG

The base station 200 determines the requirement for an MG in a BWP after switching. Specifically, the base station 200 determines the requirement for an MG based on the conditions described in 3GPP TS 38.300 as with the operation of the UE 100. The determination of the requirement for an MG is substantially the same as the operation of the UE 100 except for the determination of the requirement for an MG based on a report about the requirement for an MG from the UE 100. The determination of the requirement for an MG will not be thus described.

In the determination of the requirement for an MG based on a report about the requirement for an MG from the UE 100, the operation of the base station 200 is different from the operation of the UE 100 in that the base station 200 receives a report from the UE 100.

For example, the base station 200 determines the requirement for an MG in accordance with whether or not MG requirement information is reported from the UE 100. In a case where the MG requirement information is reported, the base station 200 determines that an MG is required. Note that the base station 200 may request a report of the MG requirement information. For example, the base station 200 may transmit, to the UE 100, an RRC message such as RRCReconfiguration or RRCResume including information for causing the UE 100 to report the MG requirement information.

(2-3) Configuring of Activation Status of MG

The base station 200 configures the activation status of an MG in accordance with the requirement for an MG. Specifically, the base station 200 (control unit 243) configures activation or deactivation of an MG in accordance with the requirement for an MG in a BWP after switching. The configuring of the activation status is substantially the same as the operation of the UE 100 and will not be thus described.

(3) Flow of Processing

An example of processing according to a first operation example of the second embodiment of the present disclosure will be described with reference to FIGS. 14 and 15.

An example of a schematic flow of processing of the system 1 according to the first operation example of the second embodiment of the present disclosure will be first described with reference to FIG. 14.

The UE 100 and the base station 200 determine whether or not BWP switching occurs based on a timer (S510). For example, the UE 100 and the base station 200 determine whether or not a timer for BWP switching is expired.

In a case where BWP switching occurs, the UE 100 and the base station 200 determine whether or not an MG is required in a BWP after the switching (S520). For example, in a case where the timer for the BWP switching is expired, the UE 100 and the base station 200 determine the requirement for an MG in the BWP after the switching based on the conditions described in TS 38.300 under which an MG is required. Note that the details will be described below with reference to FIG. 15.

In a case where an MG is required in the BWP after the switching, the UE 100 and the base station 200 respectively sets and configures an MG to the activated status (S530). For example, in a case where an MG is required in the BWP after the switching, the UE 100 and the base station 200 respectively sets and configures an MG whose activation status is activated. In other words, the UE 100 and the base station 200 come into operation on the assumption that the MG is activated.

In a case where no MG is required in the BWP after the switching, the UE 100 and the base station 200 respectively sets and configures an MG to the deactivated status (S540). For example, in a case where no MG is required in the BWP after the switching, the UE 100 and the base station 200 respectively sets and configures an MG whose activation status is deactivated. In other words, the UE 100 and the base station 200 come into operation on the assumption that the MG is deactivated.

Subsequently, a schematic flow of processing of determining the requirement for an MG by the UE 100 and the base station 200 according to the first operation example of the second embodiment of the present disclosure will be described with reference to FIG. 15.

The UE 100 and the base station 200 determine whether or not the requirement for an MG is reported from the UE 100 for a BWP after switching (S610). For example, the UE 100 determines whether or not to report MG requirement information to the base station 200. In addition, the base station 200 determines whether or not the MG requirement information has been reported from the UE 100.

In addition, the UE 100 and the base station 200 determine whether or not the capability of the UE 100 is adapted to the BWP after switching (S620). For example, the UE 100 and the base station 200 determine whether or not the UE 100 supports only a per-UE MG for the BWP after switching. In a case where only a per-UE MG is supported, it can be said that the UE 100 is not adapted to the BWP after switching.

In addition, the UE 100 and the base station 200 determine whether or not the Measurement frequencies in a plurality of serving cells are the same for the BWP after switching (S630). For example, the UE 100 and the base station 200 determine whether or not frequency ranges for Measurements in a plurality of serving cells are the same for the BWP after switching.

In addition, the UE 100 and the base station 200 determine whether or not the BWP after switching includes the frequency resource of a predetermined control signal (S640). For example, the UE 100 and the base station 200 determine whether or not the BWP after switching includes the frequency resource of an SSB associated with the initial BWP.

In a case where the determination in S610 or S630 indicates YES or in a case where the determination in S620 or S640 indicates NO, the processing advances to S530 and the UE 100 and the base station 200 activate an MG on the assumption that an MG is required.

In a case where the determination in S640 indicates YES, the processing advances to S540 and the UE 100 and the base station 200 deactivate an MG on the assumption that no MG is required.

Note that the MG configuration according to the first operation example described with reference to FIGS. 14 and 15 may be reflected in the TSs. Information 35 in FIG. 16 is an example of the reflection of the configuration of an MG in the TSs. Naturally, the mode of the reflection of the configuration of the MG in the TSs is not limited to this.

(4) Advantageous Effects

In this way, according to the first operation example of the second embodiment of the present disclosure, in a case where the switching of a BWP used for the communication between the UE 100 and the base station 200 occurs, activation or deactivation of an MG is set in accordance with a BWP after the switching. This allows both the UE 100 and the base station 200 to set the same activation status corresponding to the BWP after the switching without signaling between the UE 100 and the base station 200. It is thus possible to suppress a decrease in the efficiency of signaling while making the activation status of an MG consistent between the network and the UE.

In addition, according to the first operation example, activation or deactivation of an MG is set in accordance with the requirement for an MG in a BWP after switching. This allows both the UE 100 and the base station 200 to set the same activation status suitable for the BWP after switching.

In addition, the requirement for an MG in the BWP after switching is determined based on the conditions for determining the requirement for a first MG (legacy MG). For example, the requirement for an MG may be based on a report about the requirement for an MG in a BWP after switching from the UE 100. In addition, the requirement for an MG may be based on the capability of the UE 100 for a BWP after switching. In addition, the requirement for an MG may be based on a frequency for a Measurement in a serving cell in the BWP after switching. In addition, the requirement for an MG may be based on a resource for the predetermined control signal in the BWP after switching. In addition, the requirement for an MG is for the scheme of a Measurement based on the predetermined control signal. In addition, the predetermined control signal may be an SSB or a CSI-RS. This makes it possible to make conditions for setting the activation status of an MG comply with the conditions for determining the requirement for a legacy MG.

In addition, the switching of a BWP includes timer-based BWP switching. Here, in the case of the timer-based BWP switching, the UE and the base station independently come into operation in response to the BWP switching. That is, the UE and the base station independently set the activation status of an MG. However, in this case, the activation status is not synchronized or no notification of the activation status is issued between the UE and the base station. This may cause the activation status to be inconsistent between the UE and the base station. Meanwhile, it is not desirable to synchronize the activation status or issue a notification of the activation status between the UE and the base station because signaling is added. In contrast, according to the second embodiment of the present disclosure, the activation status at the time of BWP switching is set between the UE 100 and the base station 200 by using the common determination criterion of the requirement for an MG. This makes it possible to make the activation status consistent between the UE 100 and the base station 200 without signaling for synchronizing the activation status or issuing a notification of the activation status even in the case of the timer-based BWP switching.

In addition, the switching of a BWP includes switching to a predetermined BWP. The predetermined BWP includes a default BWP or an initial BWP. This makes it possible to prevent the setting of the activation status corresponding to BWP switching from being complicated by defining an operation for switching to a specific BWP.

5-3. Second Operation Example

Subsequently, a second operation example of the second embodiment of the present disclosure will be described. In the second operation example, the activation status of an MG is set based on the configuration of the activation status corresponding to a BWP after switching. Note that the contents which are substantially the same as the description in the first operation example will not be described in detail.

(1) Operation of UE 100

When BWP switching occurs, the UE 100 sets the activation status of an MG based on the configuration of the activation status corresponding to the BWP switching.

(1-1) Determination of Switching of BWP

The UE 100 determines whether or not the switching of a BWP occurs. Specifically, the UE 100 (control unit 133) determines whether or not timer-based BWP switching occurs. The determination of the timer-based BWP switching is substantially the same as the first operation example and will not be thus described.

(1-2) Setting of Activation Status of MG

When BWP switching occurs, the UE 100 sets the activation status of an MG. Specifically, the UE 100 (control unit 133) sets activation or deactivation of an MG based on the configuration of the activation status corresponding to a BWP after switching.

More specifically, when BWP switching occurs, the UE 100 sets activation or deactivation of an MG based on the default setting of the activation status corresponding to a BWP after switching. The default setting indicates activation or deactivation of an MG.

For example, when a BWP is switched to the default DL BWP or the initial DL BWP, the UE 100 activates an MG in a case where the default setting indicates activation. That is, the status is set to activation. In a case where the default setting indicates deactivation, the UE 100 deactivates an MG. That is, the status is set to deactivation.

Here, the configuration of the activation status corresponding to a BWP after switching is included in the configuration of an MG. Referring to information 43 in FIG. 17, PreconfiguredGapConfig-r17 is set in preconfiguredGap-r17 serving as part of the configuration of an MG in the case of setup. PreconfiguredGapConfig-r17 includes defaultBWP-PreconfigurdGapState-r17 as the default setting. defaultBWP-PreconfigurdGapState-r17 may have the value of activated or deactivated.

In addition, the UE 100 (communication processing unit 135) receives an RRC message including MG configuration information indicating the configuration of an MG including the configuration of the activation status corresponding to a BWP after switching. Referring to the information 43 in FIG. 17, preconfiguredGap-r17 including defaultBWP-PreconfigurdGapState-r17 is included in GapConfig. MeasGapConfig serving as MG configuration information including GapConfig is an RRC information element and is included in an RRC message. The RRC message may be, for example, an RRCReconfiguration message or an RRCResume message.

Note that the MG configuration information including the configuration of the activation status corresponding to the BWP after the switching may be the MG configuration information according to the first embodiment and may be the MG configuration information for a P-MG according to the second modification example of the first embodiment.

(2) Operation of Base Station 200

When BWP switching occurs, the base station 200 configures the activation status of an MG based on the configuration of the activation status corresponding to the BWP switching. Note that the contents which are substantially the same as the description of an operation of the UE 100 will not be described in detail.

(2-1) Determination of Switching of BWP

The base station 200 determines whether or not the switching of a BWP occurs. Specifically, the base station 200 (control unit 243) determines whether or not timer-based BWP switching occurs. The determination of the timer-based BWP switching is substantially the same as the first operation example and will not be thus described.

(2-2) Configuring of Activation Status of MG

When BWP switching occurs, the base station 200 configures the activation status of an MG. Specifically, the base station 200 (control unit 243) configures activation or deactivation of an MG based on the configuration of the activation status corresponding to a BWP after switching. The configuring of the activation status is substantially the same as the operation of the UE 100 and will not be thus described.

(3) Flow of Processing

An example of processing according to the second operation example of the second embodiment of the present disclosure will be described with reference to FIG. 18. Note that the processing which is substantially the same as the processing according to the first operation example will not be described in detail.

The UE 100 and the base station 200 determine whether or not BWP switching occurs based on a timer (S710).

In a case where BWP switching occurs, the UE 100 and the base station 200 determine whether or not the configuration of the status of an MG corresponding to the BWP switching is activated (S720). For example, in a case where a timer for the BWP switching is expired, the UE 100 and the base station 200 determine whether or not the default setting of the activation status corresponding to a BWP after the switching is activated.

In a case where the configuration of the status of an MG corresponding to the BWP switching is activated, the UE 100 and the base station 200 respectively sets and configures an MG to the activated status (S730). For example, in a case where the default setting of the activation status corresponding to the BWP after the switching is activated, the UE 100 and the base station 200 respectively sets and configures an MG whose activation status is activated. In other words, the UE 100 and the base station 200 come into operation on the assumption that the MG is activated.

In a case where the configuration of the status of an MG corresponding to the BWP switching is not activated, the UE 100 and the base station 200 respectively sets and configures an MG to the deactivated status (S740). For example, in a case where the default setting of the activation status corresponding to the BWP after the switching is deactivated, the UE 100 and the base station 200 respectively sets and configures an MG whose activation status is deactivated. In other words, the UE 100 and the base station 200 come into operation on the assumption that the MG is deactivated.

Note that the configuration of an MG according to the second operation example described with reference to FIG. 18 may be reflected in the TSs. Information 45 in FIG. 19 is an example of the reflection of the configuration of an MG in the TSs. Naturally, the mode of the reflection of the configuration of the MG in the TSs is not limited to this.

(4) Advantageous Effects

In this way, according to the second operation example of the second embodiment of the present disclosure, it is possible to reduce a decrease in the efficiency of signaling as in the first operation example while making the activation status of an MG consistent between the network and the UE.

In addition, according to the second operation example described above, activation or deactivation of an MG is set based on the configuration of the activation status corresponding to a BWP after switching. This allows both the UE 100 and the base station 200 to set the same activation status at the time of the BWP switching. In addition, it is possible to designate the activation status at the time of BWP switching without complying with the existing TSs.

In addition, the configuration of the activation status corresponding to a BWP after switching is included in the configuration of an MG. This makes it possible to integrate pieces of information associated with the configuration of an MG and increase the efficiency of signaling.

In addition, an RRC message including MG configuration information indicating the configuration of an MG including the configuration of the activation status corresponding to a BWP after switching is transmitted from the base station 200 to the UE 100. This makes it possible to notify the UE 100 of the configuration of the activation status corresponding to the BWP after switching by using the existing MG configuration information.

In addition, the configuration of the activation status indicates activation or deactivation of an MG corresponding to the BWP after switching. In this way, the setting value directly indicates the activation status, thereby allowing the configuration of the activation status to be simpler.

5-4. Modification Example

A modification example according to the first operation example and the second operation example of the second embodiment of the present disclosure will be described.

(1) Modification Example: DL Control Signal-Based BWP Switching

In the second embodiment of the present disclosure described above, the BWP switching is timer-based BWP switching. The BWP switching according to the second embodiment of the present disclosure is not, however, limited to this example.

As the modification example of the second embodiment of the present disclosure, the BWP switching may be DL control signal-based BWP switching.

Specifically, the UE 100 (communication processing unit 135) receives a DL control signal. The UE 100 (control unit 133) determines whether or not the received DL control signal includes information indicating BWP switching.

Figure 14:
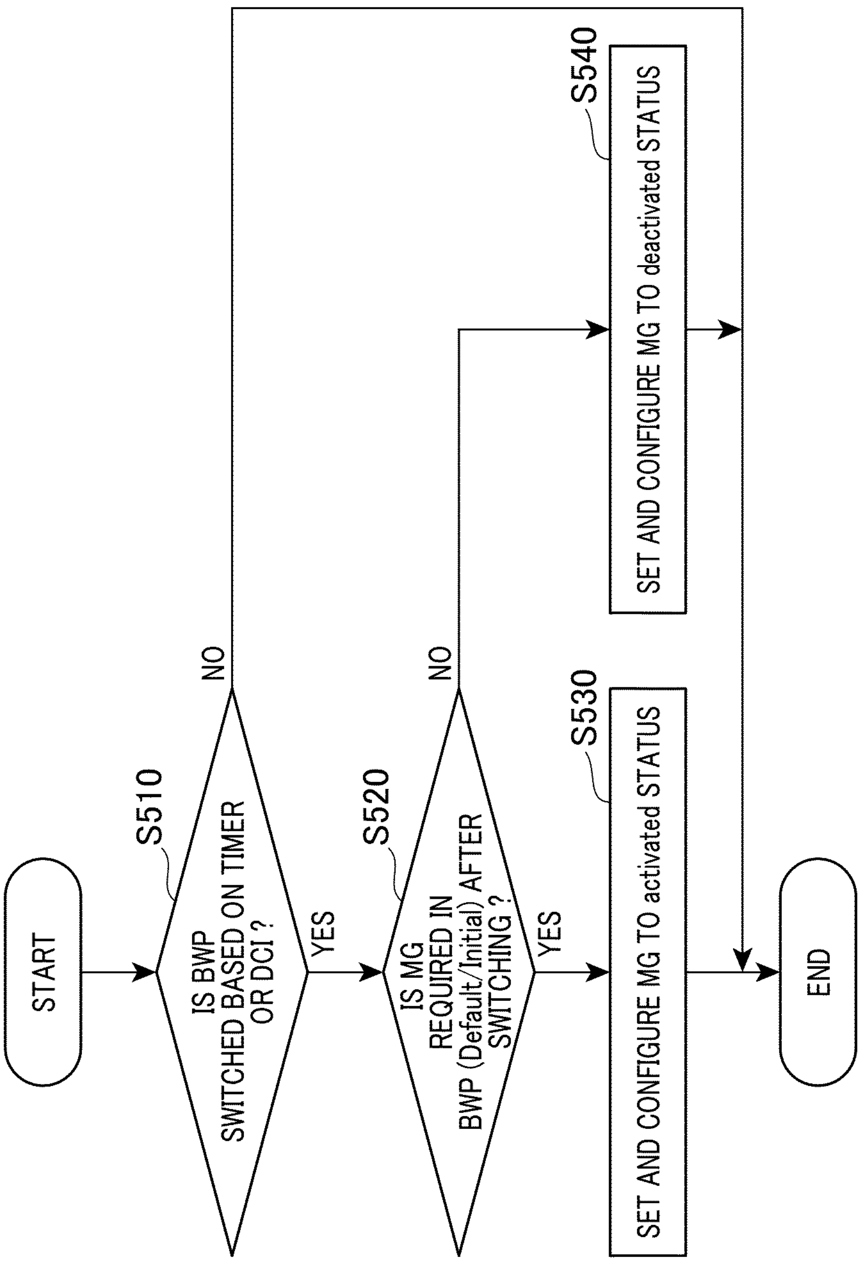
FIG. 14 is a flowchart for explaining an example of a schematic flow of processing according to a first operation example of a second embodiment of the present disclosure.
Figure 15:
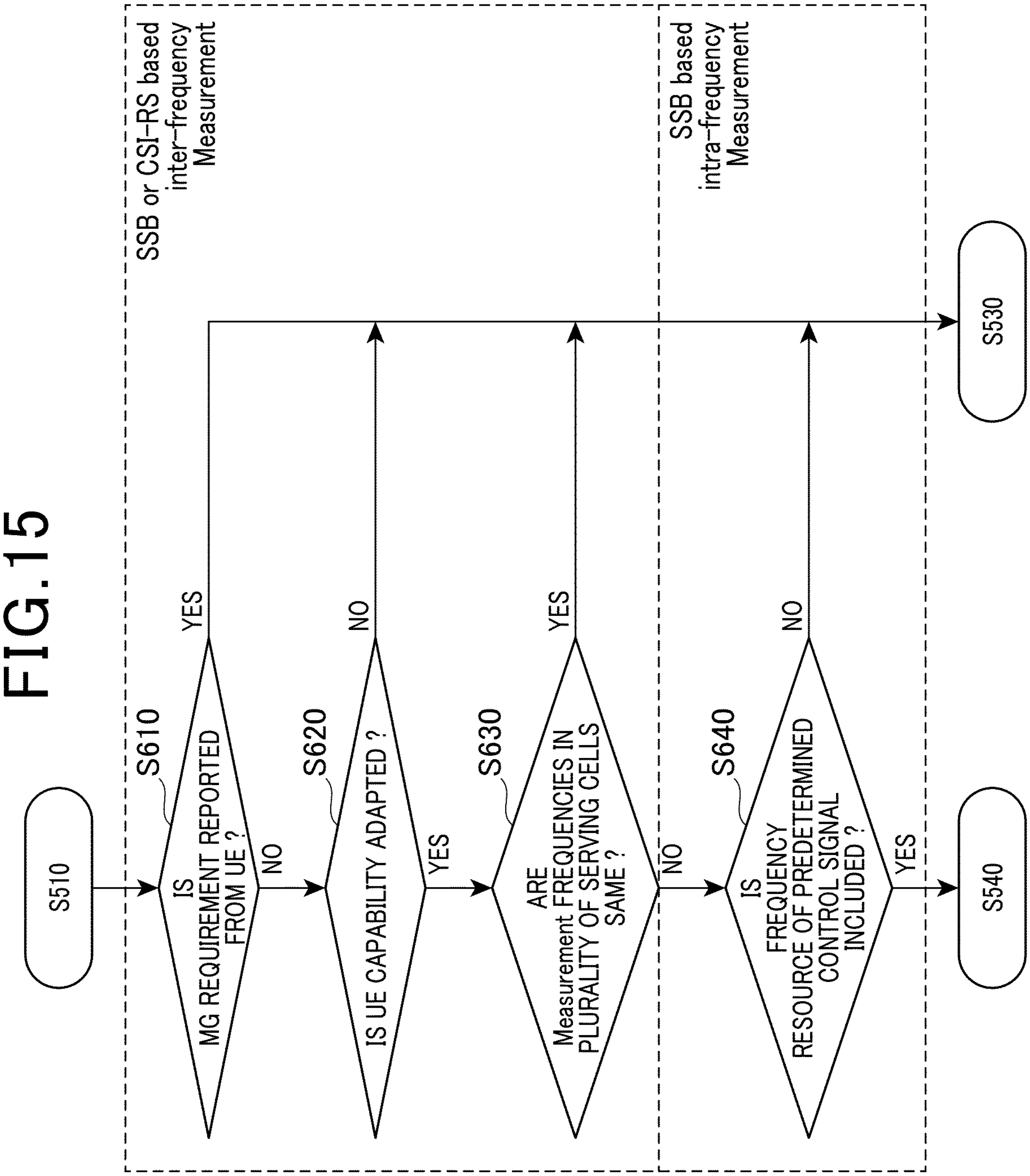
FIG. 15 is a flowchart for explaining an example of a schematic flow of processing of determining a requirement for an MG according to the first operation example of the second embodiment of the present disclosure.
Figure 18:
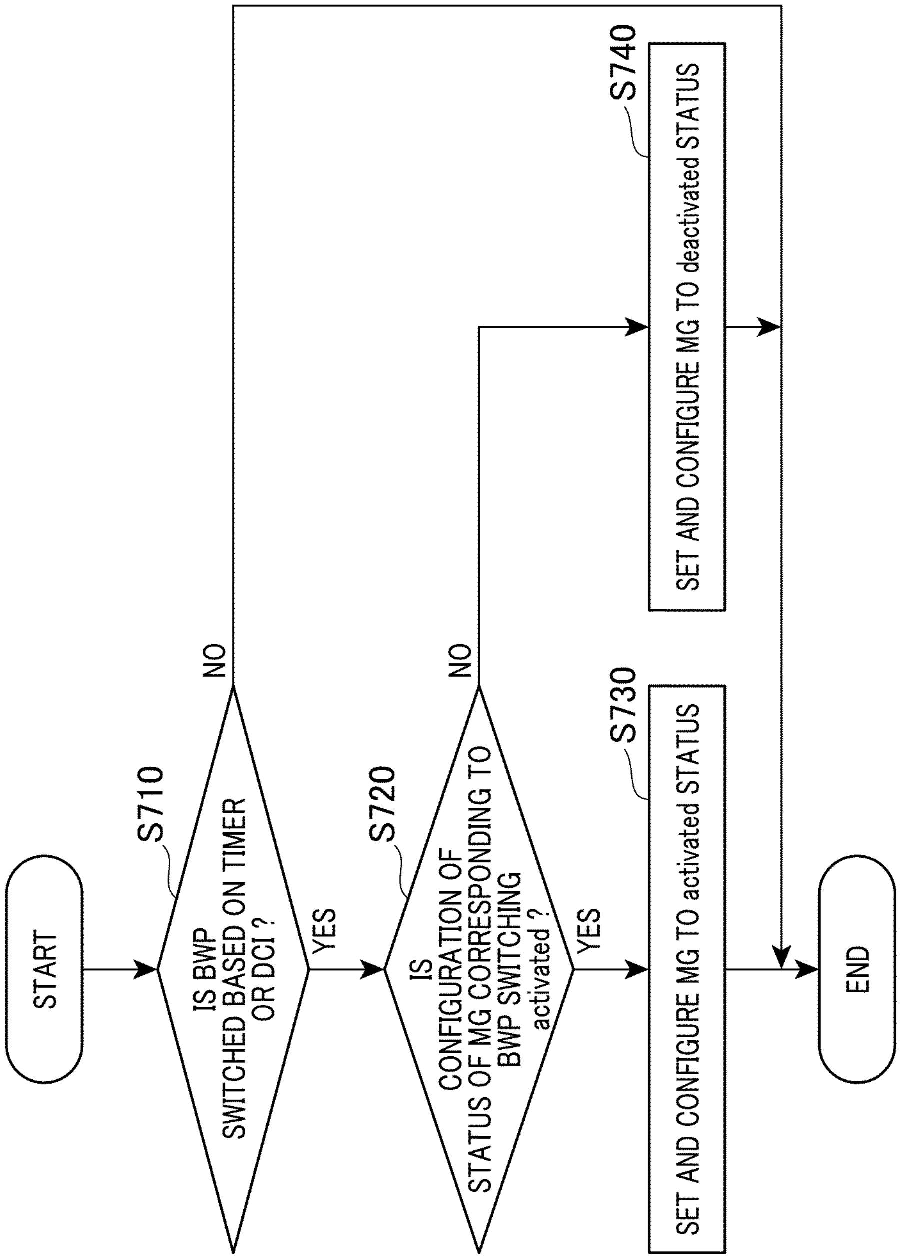
FIG. 18 is a flowchart for explaining an example of a schematic flow of processing according to the second operation example of the second embodiment of the present disclosure.

For example, as illustrated in S510 in FIG. 14 or S710 in FIG. 18, the UE 100 determines whether or not downlink control information (DCI) indicating BWP switching is received on a physical downlink control channel (PDCCH).

In this way, according to the modification example of the second embodiment of the present disclosure, the BWP switching includes DL control signal-based BWP switching. This makes it possible to explicitly synchronize the BWP switching between the UE 100 and the base station 200. It is thus possible to synchronize the setting timing of the activation status more reliably without signaling for configuring the activation status.

6. Third Embodiment

A third embodiment of the present disclosure will be described. In the third embodiment, the activation status (that is, the applicability or the enablement of MG sharing) of MG sharing is determined in synchronization with the activation status of an MG.

6-1. Operation Examples

Figure 20:
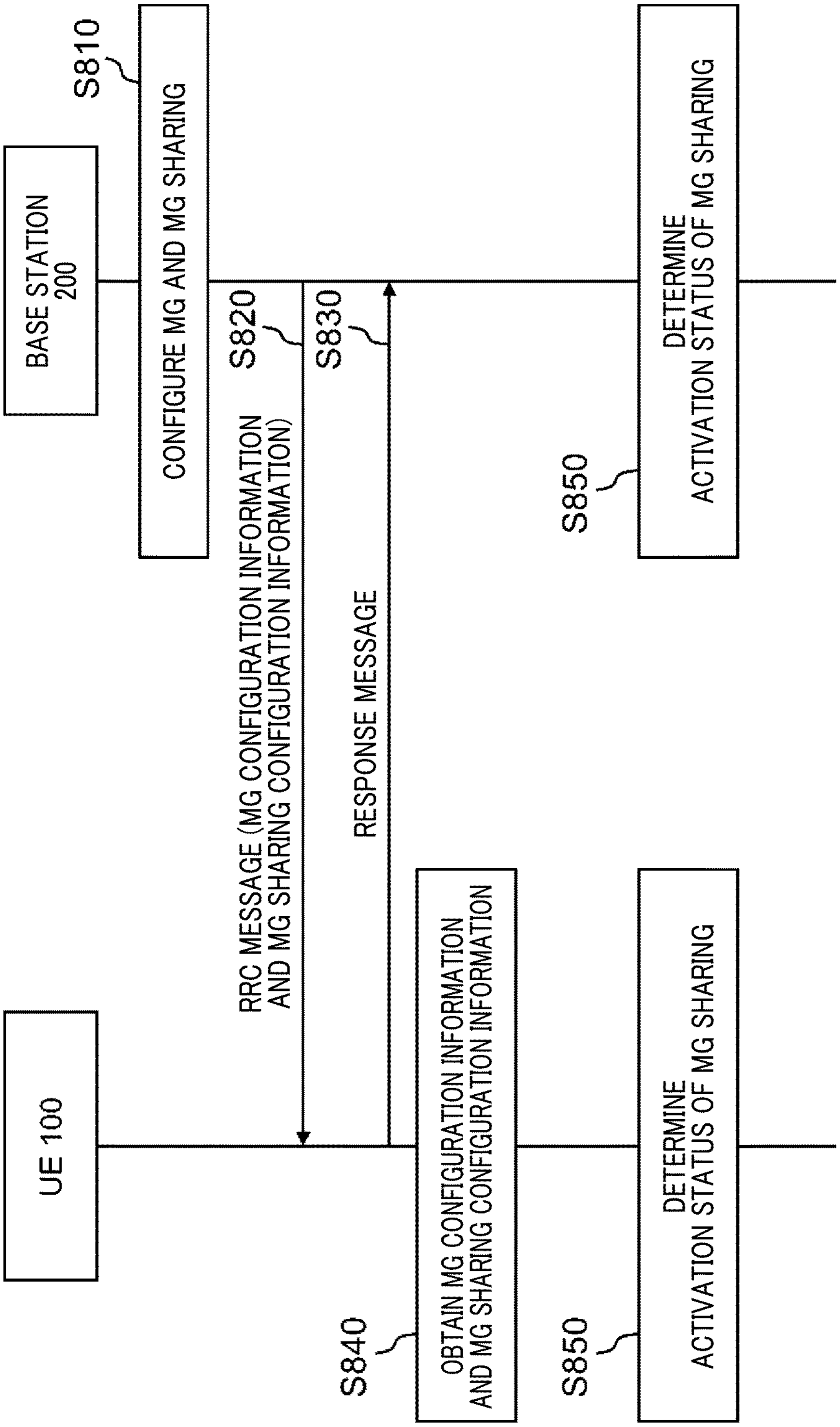
FIG. 20 is a diagram for explaining an example of a schematic flow of processing according to a third embodiment of the present disclosure.
Figure 21:
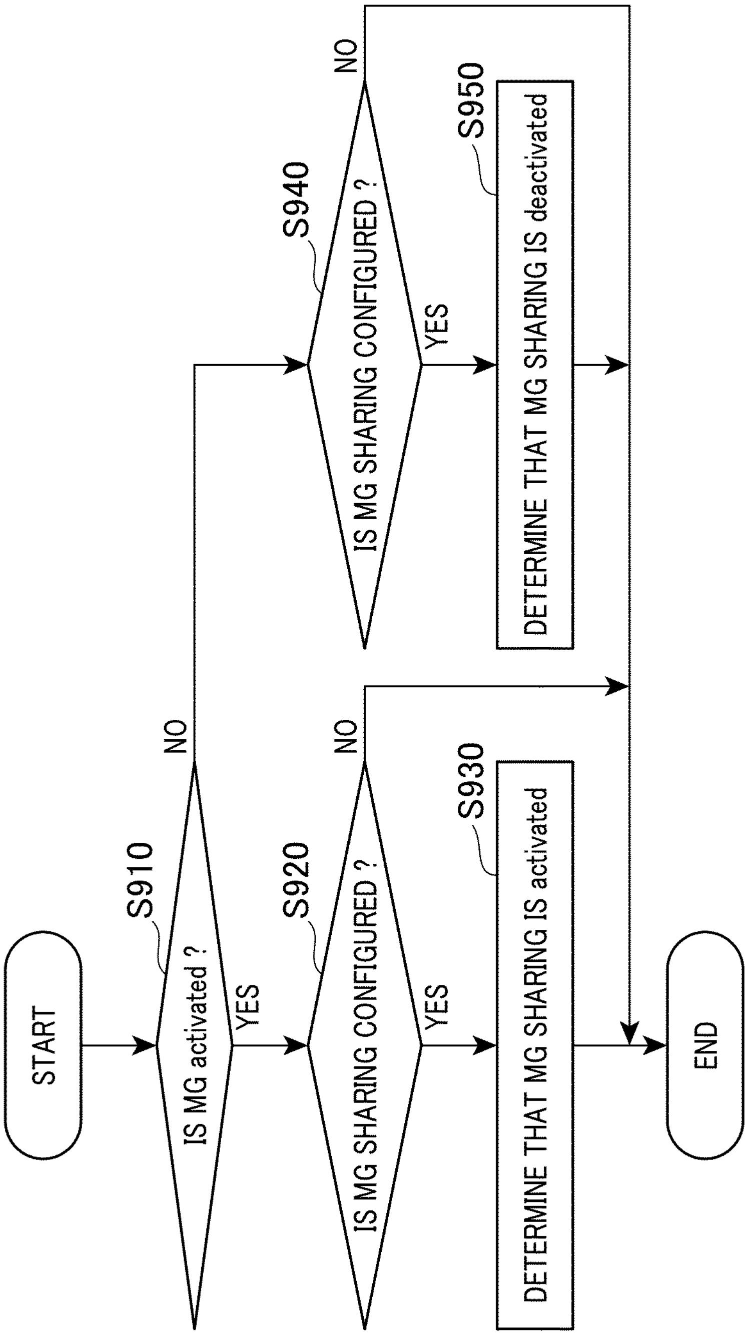
FIG. 21 is a flowchart for explaining an example of a schematic flow of an activation status determination of MG sharing according to the third embodiment of the present disclosure.

Examples of operations of the UE 100 and the base station 200 according to the third embodiment of the present disclosure will be described with reference to FIGS. 20 to 22.

(1) Operation of UE 100

The UE 100 receives MG sharing configuration information from the base station 200. The UE 100 determines based on the activation status of an MG whether or not to apply MG sharing to the MG. The following describes an operation of the UE 100 and relevant information in detail.

(1-1) Reception of MG Sharing Configuration Information

The UE 100 receives MG sharing configuration information. Specifically, the UE 100 (communication processing unit 135) receives an RRC message including the MG sharing configuration information from the base station 200. The UE 100 (information obtaining unit 131) obtains the MG sharing configuration information included in the RRC message. For example, the MG sharing configuration information is MeasGapSharingConfig that is an RRC IE.

In addition, the UE 100 receives information indicating the activation status of an MG. Specifically, the UE 100 receives an RRC message including the information indicating the activation status of an MG from the base station 200. The information indicating the activation status of an MG may be included in MG configuration information.

In addition, an RRC message including the MG sharing configuration information and the MG configuration information may be transmitted from the base station 200 to the UE 100. For example, an RRC message including Measurement configuration information including the MG sharing configuration information and the MG configuration information is transmitted from the base station 200 to the UE 100. The RRC message may be an RRCReconfiguration message or an RRCResume message.

(1-2) Determination of Activation Status of MG

The UE 100 determines the activation status of an MG. Specifically, the UE 100 (control unit 133) determines the activation status of an MG based on information indicating the activation status of the MG.

For example, the information indicating the activation status of an MG may be preconfiguredGapState-r17 as illustrated in FIG. 8 or 12. The information indicating the activation status of an MG indicates whether the MG is activated or deactivated.

Figure 10:
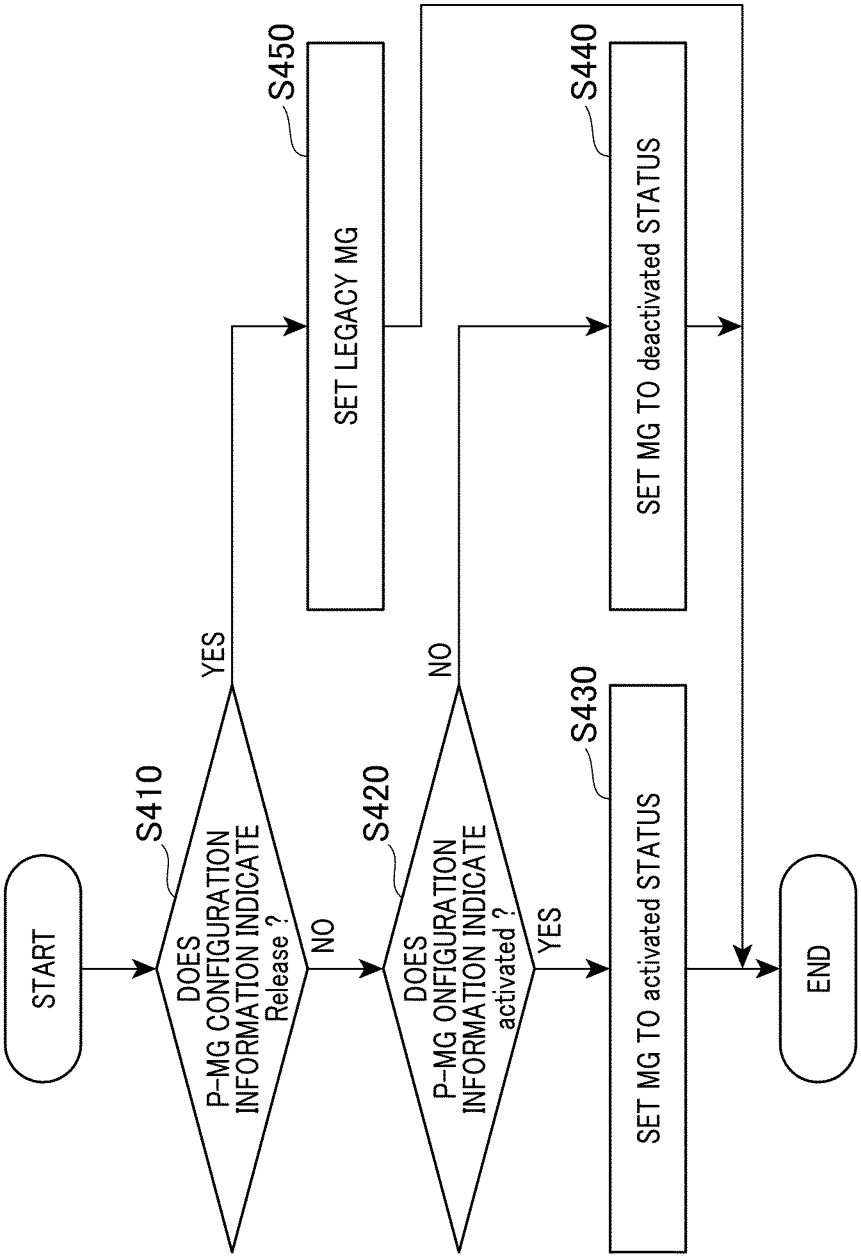
FIG. 10 is a flowchart for explaining an example of a schematic flow of MG configuring according to the first embodiment of the present disclosure.

Note that the activation status of an MG is configured or determined based on the processing according to the first embodiment as illustrated in FIG. 10 or the processing according to the second embodiment as illustrated in FIG. 14 or 18.

(1-3) Determination of Activation Status of MG Sharing

The UE 100 determines the activation status of MG sharing. Activation or deactivation of MG sharing corresponds to activation or deactivation of an MG.

Specifically, the UE 100 (control unit 133) determines activation or deactivation of MG sharing based on a determination of the activation status of an MG.

More specifically, the UE 100 (control unit 133) determines the activation status of an MG based on information indicating the activation status of the MG.

For example, in a case where an MG is set to activation, the UE 100 (control unit 133) determines that MG sharing is activated. In a case where an MG is set to deactivation, the UE 100 (control unit 133) determines that MG sharing is deactivated.

In a case where it is determined that MG sharing is activated, the configuration of the MG sharing is applied to the MG. In other words, the configuration of the MG sharing is enabled. In a case where it is determined that MG sharing is deactivated, the configuration of the MG sharing is not applied to the MG. In other words, the configuration of the MG sharing is disabled. Note that, even in a case where it is determined that MG sharing is deactivated, the configuration of the MG sharing is not discarded.

(2) Operation of Base Station 200

The base station 200 configures an MG and MG sharing and transmits MG configuration information and MG sharing configuration information to the UE 100. The base station 200 determines based on the activation status of an MG whether or not to apply MG sharing to the MG. The following describes an operation of the base station 200 and relevant information in detail. Note that the contents which are substantially the same as the description of an operation of the UE 100 will not be described in detail.

(2-1) Transmission of MG Sharing Configuration Information

The base station 200 transmits MG sharing configuration information to the UE 100. Specifically, the base station 200 (information obtaining unit 241) obtains the MG sharing configuration information. The base station 200 (communication processing unit 245) transmits an RRC message including the obtained MG sharing configuration information to the UE 100. For example, the base station 200 configures MG sharing to obtain MG sharing configuration information indicating the configuration of the MG sharing.

In addition, the base station 200 transmits, to the UE 100, information indicating the activation status of an MG. Specifically, the base station 200 transmits, to the UE 100, an RRC message including the information indicating the activation status of an MG. For example, the base station 200 also configures the activation status of an MG when configuring the MG, thereby obtaining information indicating the activation status of the MG.

(2-2) Determination of Activation Status of MG

The base station 200 determines the activation status of an MG. Specifically, the base station 200 (control unit 243) determines the activation status of an MG based on information indicating the activation status of the MG. The determination of the activation status of an MG is substantially the same as the operation of the UE 100 and will not be thus described.

(2-3) Determination of Activation Status of MG Sharing

The base station 200 determines the activation status of MG sharing. Specifically, the base station 200 (control unit 243) determines activation or deactivation of MG sharing based on a determination of the activation status of an MG. The determination of the activation status of MG sharing is substantially the same as the operation of the UE 100 and will not be thus described.

(3) Flow of Processing

An example of processing according to the third embodiment of the present disclosure will be described with reference to FIGS. 20 and 21.

An example of a schematic flow of processing of the system 1 according to the third embodiment of the present disclosure will be first described with reference to FIG. 20.

The base station 200 configures an MG and MG sharing (S810). For example, the base station 200 configures an MG and MG sharing and generates MG configuration information and MG sharing configuration information.

The base station 200 transmits an RRC message including the MG configuration information and the MG sharing configuration information to the UE 100 (S820). For example, the base station 200 transmits an RRCReconfiguration message or an RRCResume message including measGapConfig and measGapSharingConfig to the UE 100. measGapConfig includes preconfiguredGapState-r17 serving as information indicating the activation status of an MG.

The UE 100 transmits a response message to the base station 200 in response to the received RRC message (S830). For example, when the UE 100 receives the RRCReconfiguration message or the RRCResume message including measGapConfig and measGapSharingConfig from the base station 200, the UE 100 transmits an RRCReconfigurationComp message or an RRCResumeComp message to the base station 200.

The UE 100 obtains the MG configuration information and the MG sharing configuration information from the received RRC message (S840). For example, the UE 100 obtains measGapConfig and measGapSharingConfig from the received RRCReconfiguration message or RRCResume message.

The UE 100 and the base station 200 determine the activation status of MG sharing (S850). For example, the UE 100 and the base station 200 determine the activation status of MG sharing based on information indicating the activation status of an MG. The processing in S850 will be described in detail below with reference to FIG. 21.

Subsequently, an example of a schematic flow of processing of determining the activation status of MG sharing by the UE 100 and the base station 200 according to the third embodiment of the present disclosure will be described with reference to FIG. 21.

The UE 100 and the base station 200 determine whether or not an MG is activated (S910). For example, the UE 100 and the base station 200 determine based on information indicating the activation status of the MG whether or not the MG is activated.

In a case where the MG is activated, the UE 100 and the base station 200 determine whether or not MG sharing is configured (S920). For example, in a case where the information indicating the activation status of the MG indicates activation, the UE 100 determines whether or not MG sharing configuration information is received from the base station 200. The base station 200 determines whether or not MG sharing has been configured.

In a case where MG sharing is configured, the UE 100 and the base station 200 determine that MG sharing is activated (S930). For example, in a case where MG sharing is configured, the UE 100 and the base station 200 determine that MG sharing is activated. In other words, the UE 100 and the base station 200 come into operation on the assumption that MG sharing is activated.

In a case where the MG is not activated, the UE 100 and the base station 200 determine whether or not MG sharing is configured (S940).

In a case where MG sharing is configured, the UE 100 and the base station 200 determine that MG sharing is deactivated (S950). For example, in a case where MG sharing is configured, the UE 100 and the base station 200 determine that MG sharing is deactivated. In other words, the UE 100 and the base station 200 come into operation on the assumption that MG sharing is deactivated.

Note that the activation status determination of MG sharing described with reference to FIG. 21 may be reflected in the TSs. Information 51 in FIG. 22 and information 53 in FIG. 23 are examples of the reflection of the activation status determination of MG sharing in the TSs. Naturally, the modes of the reflection of the activation status determination of MG sharing in the TSs are not limited to these.

(4) Advantageous Effects

In this way, according to the third embodiment of the present disclosure, an RRC message including MG sharing configuration information is transmitted from the base station 200 to the UE 100 and activation or deactivation of MG sharing corresponds to activation or deactivation of an MG. This makes it possible to decide whether or not to apply the MG sharing in accordance with the activation status of the MG. It is thus possible to apply MG sharing to an MG that may have the status of activation or deactivation.

In addition, activation or deactivation of MG sharing is determined based on a determination of the activation status of an MG. This allows both the UE 100 and the base station 200 that may grasp the activation status of the MG to determine the activation status of the MG sharing.

In addition, the activation status of an MG is determined based on information indicating the activation status of the MG. This makes it possible to make the activation status of MG sharing correspond to the activation status of the MG more reliably.

In addition, an RRC message including the information indicating the activation status of an MG is transmitted from the base station 200 to the UE 100. This makes it possible to synchronize the activation status of the MG between the UE 100 and the base station 200. Thus, it is also possible to synchronize the activation status of MG sharing.

In addition, the information indicating the activation status of an MG is included in MG configuration information and an RRC message including the MG configuration information and MG sharing configuration information is transmitted from the base station 200 to the UE 100. The information indicating the activation status of an MG and the MG sharing configuration information are thus transmitted in the same RRC message. This makes it possible to reduce the possibility of inconsistency between the activation status of the MG and the activation status of MG sharing.

In addition, in a case where an MG is set to activation, it is determined that MG sharing is activated. In a case where the MG is set to deactivation, it is determined that MG sharing is deactivated. This makes it possible to make the activation status consistent between the MG and the MG sharing.

While embodiments of the present disclosure have been described above, the present disclosure is not limited to the embodiments. It will be understood by those skilled in the art that the embodiments are merely examples and various changes can be made without departing from the scope and the spirit of the present disclosure.

For example, steps in processing described in the present specification do not necessarily have to be performed chronologically in the order described in the flowchart or the sequence diagram. For example, steps in processing may be performed in an order different from the order described as the flowchart or the sequence diagram or may be performed in parallel. In addition, some of steps in processing may be removed or a further step may be added to the processing.

For example, there may be provided a method including the operations of one or more components of the apparatus described in the present specification or there may be provided a program for causing a computer to perform the operations of the components. Moreover, there may be provided a non-transitory tangible computer-readable storage medium having stored therein the program. Naturally, such a method, program, and non-transitory tangible computer-readable storage medium are also included in the present disclosure.

For example, in the present disclosure, a user equipment (UE) may be referred to by another name such as mobile station, mobile terminal, mobile apparatus, mobile unit, subscriber station, subscriber terminal, subscriber apparatus, subscriber unit, wireless station, wireless terminal, wireless apparatus, wireless unit, remote station, remote terminal, remote apparatus, or remote unit.

For example, in the present disclosure, "transmit" may mean performing processing of at least one layer in a protocol stack used for transmission or physically transmitting a signal wirelessly or by wire. Alternatively, "transmit" may mean a combination of performing the processing of the at least one layer and physically transmitting a signal wirelessly or by wire. Similarly, "receive" may mean performing processing of at least one layer in a protocol stack used for reception or physically receiving a signal wirelessly or by wire. Alternatively, "receive" may mean a combination of performing the processing of the at least one layer and physically receiving a signal wirelessly or by wire. The at least one layer may be replaced with at least one protocol.

For example, in the present disclosure, "obtain/acquire" may mean obtaining/acquiring information from stored information, obtaining/acquiring information from information received from another node, or obtaining/acquiring information by generating the information.

For example, in the present disclosure, "include" and "comprise" do not mean that listed items alone are included, but mean that listed items alone may be included or a further item may be included in addition to the listed items.

For example, in the present disclosure, "or" does not mean exclusive OR, but means inclusive OR.

Note that the technical features included in the embodiments may be represented as the following features. Naturally, the present disclosure is not limited to the following features.

(Feature 1)

A user equipment (100) comprising:

a communication processing unit (135) configured to receive, from a base station (200), a radio resource control, RRC, message including measurement gap, MG, sharing configuration information; and an information obtaining unit (131) configured to obtain the MG sharing configuration information included in the RRC message, wherein activation or deactivation of the MG sharing corresponds to activation or deactivation of an MG.

(Feature 2)

The user equipment according to Feature 1, wherein activation or deactivation of the MG sharing is determined based on a determination of an activation status of the MG.

(Feature 3)

The user equipment according to Feature 2, wherein the activation status of the MG is determined based on information indicating the activation status of the MG.

(Feature 4)

The user equipment according to Feature 3, wherein the communication processing unit is configured to receive, from the base station, an RRC message including the information indicating the activation status of the MG.

(Feature 5)

The user equipment according to Feature 4, wherein the information indicating the activation status of the MG is included in MG configuration information, and the communication processing unit is configured to receive, from the base station, an RRC message including the MG configuration information and the MG sharing configuration information.

(Feature 6)

The user equipment according to any one of Features 1 to 5, wherein the MG sharing is determined to be activated in a case where the MG is set to activation, and the MG sharing is determined to be deactivated in a case where the MG is set to deactivation.

(Feature 7)

A base station (200) comprising:

an information obtaining unit (241) configured to obtain measurement gap, MG, sharing configuration information; and a communication processing unit (245) configured to transmit, to a user equipment (100), a radio resource control, RRC, message including the MG sharing configuration information, wherein activation or deactivation of the MG sharing corresponds to activation or deactivation of an MG.

(Feature 8)

A method performed by a user equipment (100), comprising:

receiving, from a base station (200). a radio resource control, RRC, message including measurement gap, MG, sharing configuration information; and obtaining the MG sharing configuration information included in the RRC message, wherein activation or deactivation of the MG sharing corresponds to activation or deactivation of an MG.

(Feature 9)

A method performed by a base station (200), comprising:

obtaining measurement gap, MG, sharing configuration information; and transmitting, to a user equipment (100). a radio resource control, RRC, message including the MG sharing configuration information, wherein activation or deactivation of the MG sharing corresponds to activation or deactivation of an MG.

(Feature 10)

A program for causing a computer to execute operations of:

receiving, from a base station (200), a radio resource control, RRC, message including measurement gap, MG, sharing configuration information; and obtaining the MG sharing configuration information included in the RRC message, wherein activation or deactivation of the MG sharing corresponds to activation or deactivation of an MG.

(Feature 11)

A program for causing a computer to execute operations of:

obtaining measurement gap, MG, sharing configuration information; and transmitting, to a user equipment (100), a radio resource control, RRC, message including the MG sharing configuration information, wherein activation or deactivation of the MG sharing corresponds to activation or deactivation of an MG.

(Feature 12)

A non-transitory tangible computer-readable storage medium having stored therein a program for causing a computer to execute operations of:

receiving, from a base station (200), a radio resource control, RRC, message including measurement gap, MG, sharing configuration information; and obtaining the MG sharing configuration information included in the RRC message, wherein activation or deactivation of the MG sharing corresponds to activation or deactivation of an MG.

(Feature 13)

A non-transitory tangible computer-readable storage medium having stored therein a program for causing a computer to execute operations of:

obtaining measurement gap, MG, sharing configuration information; and transmitting, to a user equipment (100), a radio resource control, RRC, message including the MG sharing configuration information, wherein activation or deactivation of the MG sharing corresponds to activation or deactivation of an MG.

What is claimed is:

1. An apparatus comprising:

a memory storing a program; and one or more processors configured to execute the program to:

receive a radio resource control, RRC, message including first configuration information and second configuration information, the first configuration information including information for indicating that a measurement gap is a pre-configured measurement gap and information on sharing of the pre-configured measurement gap, the second configuration information including information for indicating that the pre-configured measurement gap is activated or deactivated;

activate or deactivate, based on switching of a downlink bandwidth part, BWP, the pre-configured measurement gap according to the information for indicating that the pre-configured measurement gap is activated or deactivated included in the second configuration information in a case where the first configuration information includes the information for indicating that the measurement gap is the pre-configured measurement gap; and apply a sharing scheme based on the information on the sharing of the pre-configured measurement gap to the activated pre-configured measurement gap in a case where the pre-configured measurement gap is activated.

2. The apparatus according to claim 1, wherein the sharing scheme based on the information on the sharing of the pre-configured measurement gap is not applied to the deactivated pre-configured measurement gap in a case where the pre-configured measurement gap is deactivated.

3. A base station comprising:

a memory storing a program; and one or more processors configured to execute the program to transmit a radio resource control, RRC, message including first configuration information and second configuration information, the first configuration information including information for indicating that a measurement gap is a pre-configured measurement gap and information on sharing of the pre-configured measurement gap, the second configuration information including information for indicating that the pre-configured measurement gap is activated or deactivated, wherein the pre-configured measurement gap is activated or deactivated, based on switching of a downlink bandwidth part, BWP, according to the information for indicating that the pre-configured measurement gap is activated or deactivated included in the second configuration information in a case where the first configuration information includes the information for indicating that the measurement gap is the pre-configured measurement gap, and a sharing scheme based on the information on the sharing of the pre-configured measurement gap is applied to the activated pre-configured measurement gap in a case where the pre-configured measurement gap is activated.

4. The base station according to claim 3, wherein the sharing scheme based on the information on the sharing of the pre-configured measurement gap is not applied to the deactivated pre-configured measurement gap in a case where the pre-configured measurement gap is deactivated.

5. A communication method of an apparatus, comprising:

receiving a radio resource control, RRC, message including first configuration information and second configuration information, the first configuration information including information for indicating that a measurement gap is a pre-configured measurement gap and information on sharing of the pre-configured measurement gap, the second configuration information including information for indicating that the pre-configured measurement gap is activated or deactivated;

activating or deactivating, based on switching of a downlink bandwidth part, BWP, the pre-configured measurement gap according to the information for indicating that the pre-configured measurement gap is activated or deactivated included in the second configuration information in a case where the first configuration information includes the information for indicating that the measurement gap is the pre-configured measurement gap; and applying a sharing scheme based on the information on the sharing of the pre-configured measurement gap to the activated pre-configured measurement gap in a case where the pre-configured measurement gap is activated.

6. The communication method according to claim 5, wherein the sharing scheme based on the information on the sharing of the pre-configured measurement gap is not applied to the deactivated pre-configured measurement gap in a case where the pre-configured measurement gap is deactivated.

* * * * *